(12) United States Patent
Kim et al.

(10) Patent No.: US 11,438,040 B2
(45) Date of Patent: Sep. 6, 2022

(54) DATA TRANSMISSION APPARATUS AND METHOD USING POLARIZED ANTENNA IN WIRELESS AV SYSTEM

(71) Applicant: LG ELECTRONICS INC., Seoul (KR)

(72) Inventors: Jinmin Kim, Seoul (KR); Jaewook Song, Seoul (KR); Hyowon Bae, Seoul (KR); Jinsoo Choi, Seoul (KR); Kyuin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/299,740

(22) PCT Filed: Dec. 2, 2019

(86) PCT No.: PCT/KR2019/016874
§ 371 (c)(1),
(2) Date: Jun. 3, 2021

(87) PCT Pub. No.: WO2020/116883
PCT Pub. Date: Jun. 11, 2020

(65) Prior Publication Data
US 2022/0021422 A1 Jan. 20, 2022

Related U.S. Application Data

(60) Provisional application No. 62/775,906, filed on Dec. 6, 2018.

(51) Int. Cl.
*H04L 5/12* (2006.01)
*H04B 7/0456* (2017.01)
(Continued)

(52) U.S. Cl.
CPC ......... *H04B 7/0456* (2013.01); *H04B 7/0408* (2013.01); *H04B 7/0491* (2013.01);
(Continued)

(58) Field of Classification Search
CPC .. H04B 7/0456; H04B 7/0408; H04B 7/0491; H04B 7/0608; H04B 7/0617; H01Q 19/13; H01Q 21/24
(Continued)

(56) References Cited

U.S. PATENT DOCUMENTS

| | | |
|---|---|---|
| 2017/0111099 A1 | 4/2017 | Jo et al. |
| 2018/0198508 A1 | 7/2018 | Kasher et al. |
| 2019/0044596 A1* | 2/2019 | Bolotin ................ H04B 7/0413 |

FOREIGN PATENT DOCUMENTS

| | | |
|---|---|---|
| WO | 2017190354 | 11/2017 |
| WO | 2017191900 | 11/2017 |

OTHER PUBLICATIONS

PCT International Application No. PCT/KR2019/016874, International Search Report dated Mar. 10, 2020, 4 pages.
(Continued)

*Primary Examiner* — Zewdu A Kassa
(74) *Attorney, Agent, or Firm* — Lee Hong Degerman Kang Waimey

(57) ABSTRACT

The present disclosure relates to a data transmission apparatus and method using a polarized antenna in a wireless AV system, and a data reception apparatus and method. The present specification provides a method for performing polarization alignment for a downlink on the basis of reciprocity, a method for performing polarization alignment for an uplink, and a method for performing polarization alignment independently for each DMG antenna when one data transmission apparatus or one data reception apparatus uses multiple DMG antennas. Optimal MIMO performance (Continued)

can be guaranteed by aligning polarization between multiple antennas of the data transmission apparatus and the data reception apparatus in the wireless AV system, the polarization alignment for a downlink or an uplink may be selectively performed on the basis of reciprocity, and polarization distortion can be reduced through the independent polarization alignment between each DMG antenna.

16 Claims, 14 Drawing Sheets

(51) Int. Cl.
  *H04B 7/0408* (2017.01)
  *H04B 7/0491* (2017.01)
  *H04B 7/06* (2006.01)
  *H01Q 19/13* (2006.01)
  *H01Q 21/24* (2006.01)

(52) U.S. Cl.
  CPC ......... *H04B 7/0608* (2013.01); *H04B 7/0617* (2013.01); *H01Q 19/13* (2013.01); *H01Q 21/24* (2013.01)

(58) Field of Classification Search
  USPC .................................. 375/262, 261, 260, 259
  See application file for complete search history.

(56) References Cited

OTHER PUBLICATIONS

Zhou, et al., "WLANs: Design Challenges and Solutions," IEEE 802.11ay based mmWave, publication in IEEE Communications Surveys & Tutorials, arXiv: 1803.07808 v1, Mar. 2018, 28 pages.

\* cited by examiner (A)

(B)

DATA TRANSMISSION APPARATUS AND METHOD USING POLARIZED ANTENNA IN WIRELESS AV SYSTEM

CROSS-REFERENCE TO RELATED APPLICATIONS

This application is the National Stage filing under 35 U.S.C. 371 of International Application No. PCT/KR2019/016874, filed on Dec. 2, 2019, which claims the benefit of U.S. Provisional Patent Application No. 62/775,906, filed on Dec. 6, 2018, the contents of which is hereby incorporated by reference herein in its entirety.

BACKGROUND OF THE DISCLOSURE

Field of the Disclosure

The present specification relates to a wireless audio/video (AV) system and, most particularly, to a data transmitting device and method using a polarization antenna in a wireless AV system.

Related Art

Recently, there is a growing demand for high-resolution and high-quality pictures such as a high definition (HD) picture and an ultra-high definition (UHD) picture in various fields. The higher the resolution and quality of picture data, the greater the amount of information of bits to be transmitted relative to the existing picture data. Therefore, transmission cost may increase when the picture data is transmitted using a medium such as the existing wired/wireless broadband line.

Meanwhile, the institute of electrical and electronics engineers (IEEE) 802.11ad standard is a high-speed wireless communication standard which operates in a band of at least 60 GHz. A signal reachable range is about 10 meters, but a throughput of at least 6 Gbps may be supported. The IEEE 802.11ad standard provides a beamforming training process for antenna beam alignment. IEEE 802.11ay is a next-generation standard which is under development for the purpose of a throughput of at least 20 Gbps based on the IEEE 802.11ad.

Multiple access and communication between a plurality of unspecified devices are premised in case of the existing standard such as a series of IEEE 802.11ad or ay. Therefore, a data format or frame format used by a medium access control (MAC) layer or physical layer of the series of IEEE 802.11ad or ay includes a plurality of control information fields for controlling and managing resources and operations of a plurality of devices. However, in an application of a wireless AV system to which the present disclosure belongs, wireless communication in a situation where peer devices are specified is premised in most cases (e.g., communication between a wireless set-top box and a wireless TV).

In a wireless AV system, a data transmitting device and/or data receiving device may be equipped with multiple antennas. Most particularly, in case the data transmitting device and/or data receiving device use(s) a polarization antenna, orthogonality among the antennas may be ensured. When performing multiple input multiple output (MIMO) transmission through a polarization antenna, since inter-stream interference (ISI) may be removed, optimal MIMO performance can be ensured. However, if polarization between a data transmitting device and a data receiving device is not aligned, it becomes impossible to ensure performance. Therefore, a device and method that is capable of aligning the polarization between a data transmitting device and a data receiving device is required.

SUMMARY OF THE DISCLOSURE

Technical Objects

A technical object of the present specification is to provide a data transmitting device and method using a polarization antenna in a wireless AV system.

Another technical object of the present specification is to provide a data transmitting device and method and a data receiving device and method aligning the polarization of antennas in a wireless AV system.

Another technical object of the present specification is to provide a method for performing polarization alignment for a downlink and a method for performing polarization alignment for an uplink based on reciprocity in a wireless AV system.

Another technical object of the present specification is to provide is a method for independently performing polarization alignment per directional multi-gigabit (DMG) antenna, in case one data transmitting device or one data receiving device uses multiple DMG antennas in a wireless AV system.

Technical Solutions

According to an aspect of the present specification, provided herein is a data transmitting device in a wireless audio/video (AV) system. The data transmitting device may include multiple dual polarization antennas each operating as two different poles, a communication circuit performing multiple input multiple output (MIMO) beamforming during a data transmission interval (DTI) within a beacon interval (BI), transmitting each of multiple training fields (TRNs) being generated based on different orthogonal sequences, to a data receiving device, through each corresponding dual polarization antenna, and transmitting a physical layer protocol data unit (PPDU) frame to the data receiving device, based on the MIMO beamforming, and a processor being operatively connected to the communication circuit and being configured to generate AV data that is to be transmitted through the PPDU frame and to provide the generated AV data to the communication circuit.

In an aspect, polarization alignment for the multiple dual polarization antennas may be performed based on the multiple training fields.

In another aspect, the multiple training fields may be transmitted by being included in a beacon frame as receive training fields (TRN-Rs), and the polarization alignment may be performed in a sector level sweep (SLS) phase.

In another aspect, in case reciprocity in polarization is satisfied, polarization alignment for a link of a direction from the data receiving device to the data transmitting device may be skipped.

In another aspect, in case reciprocity in polarization is not satisfied, polarization alignment for a link of a direction from the data receiving device to the data transmitting device may be performed within an Association Beamforming Training (A-BFT), and the multiple training fields may be transmitted by being included in a sector sweep (SSW) frame.

In another aspect, the multiple training fields may be transmitted by being included in an enhanced directional multi-gigabit (EDMG) beam refinement protocol-reception (BRP-RX) packet as receive training fields (TRN-Rs), and the polarization alignment may be performed in a MIMO BRP receive sector sweep (RXSS) phase.

In another aspect, the multiple training fields may be transmitted by being included in an enhanced directional multi-gigabit (EDMG) beam refinement protocol-reception (BRP-RX) packet as receive training fields (TRN-Rs), and the polarization alignment may be performed in a polarization receive sector sweep (RXSS) phase being configured before the MIMO BRP RXSS phase.

In another aspect, the communication circuit may transmit the EDMG BRP-RX packet along an optimal sector direction.

In another aspect, the multiple training fields may be transmitted by being included in an enhanced directional multi-gigabit (EDMG) beam refinement protocol-reception/transmission (BRP-RX/TX) packet as receive/transmit training fields (TRN-R/Ts), and the polarization alignment may be performed in a MIMO BRP transmit sector sweep (TXSS) phase.

In a further aspect, the communication circuit may perform the polarization alignment and TX sector sweep at the same time based on the EDMG BRP-RX/TX packet.

According to another aspect of the present specification, provided herein is a data receiving device in a wireless audio/video (AV) system. The data receiving device may include multiple dual polarization antennas each operating as two different poles, a communication circuit performing multiple input multiple output (MIMO) beamforming during a data transmission interval (DTI) within a beacon interval (BI), receiving each of multiple training fields (TRNs) being generated based on different orthogonal sequences, from a data transmitting device, through each corresponding dual polarization antenna, and receiving a physical layer protocol data unit (PPDU) frame from the data transmitting device, based on the MIMO beamforming, and a processor being operatively connected to the communication circuit and being configured to recover AV data being transmitted through the PPDU frame.

In an aspect, the communication circuit may perform polarization alignment for the multiple dual polarization antennas based on the multiple training fields and calculates polarization alignment values related to each of the multiple dual polarization antennas.

In another aspect, the multiple training fields may be received by being included in a beacon frame as receive training fields (TRN-Rs), and the polarization alignment may be performed in a sector level sweep (SLS) phase.

In another aspect, in case reciprocity in polarization is satisfied, polarization alignment for a link of a direction from the data receiving device to the data transmitting device may be skipped.

In another aspect, in case reciprocity in polarization is not satisfied, polarization alignment for a link of a direction from the data receiving device to the data transmitting device may be performed within an Association Beamforming Training (A-BFT), and the multiple training fields may be received by being included in a sector sweep (SSW) frame.

In another aspect, the multiple training fields may be received by being included in an enhanced directional multi-gigabit (EDMG) beam refinement protocol-reception (BRP-RX) packet as receive training fields (TRN-Rs), and the polarization alignment may be performed in a MIMO BRP receive sector sweep (RXSS) phase.

In another aspect, the multiple training fields may be received by being included in an enhanced directional multi-gigabit (EDMG) beam refinement protocol-reception (BRP-RX) packet as receive training fields (TRN-Rs), and the polarization alignment may be performed in a polarization receive sector sweep (RXSS) phase being configured before the MIMO BRP RXSS phase.

In another aspect, the communication circuit may receive the EDMG BRP-RX packet along an optimal sector direction.

In another aspect, the multiple training fields may be received by being included in an enhanced directional multi-gigabit (EDMG) beam refinement protocol-reception/transmission (BRP-RX/TX) packet as receive/transmit training fields (TRN-R/Ts), the polarization alignment may be performed in a MIMO BRP transmit sector sweep (TXSS) phase, and the communication circuit may calculate polarization alignment values for each transmit sector.

In a further aspect, the communication circuit may perform the polarization alignment and TX sector sweep at the same time based on the EDMG BRP-RX/TX packet.

Effects Of The Disclosure

By aligning the polarization among multiple antennas of a data transmitting device and a data receiving device in a wireless AV system, optimal MIMO performance may be ensured, polarization alignment for downlink or uplink may be optionally, performed based on reciprocity, and distortion in polarization may be reduced by independently performing polarization alignment per DMG antenna.

DESCRIPTION OF EXEMPLARY EMBODIMENTS

Hereinafter, embodiments of a wireless data transmitting device and method and a wireless data receiving device and method are described in detail according to the present disclosure, but the present disclosure is not limited thereto. Features of the present disclosure are described by the illustrated embodiments. However, functions and structures identical or equivalent to the embodiments described in the present specification are included within the spirit and scope of the present disclosure, and may also be achieved by other intended embodiments. Throughout the present specification, like reference numbers indicate like parts or features. Hereinafter, embodiments of the present disclosure will be described in detail with reference to the accompanying drawings.

Recently, a design of a display device such as a TV is becoming more important, and a display panel is gradually becoming thinner with the development of a display panel technology such as OLED. However, there is a limitation in producing and designing a thinner display panel due to a basic thickness of a driving circuit which drives the display panel. Therefore, there is a growing attention for a technique in which the remaining components other than inevitable components to be physically and electrically coupled with the display panel are separated from the display panel and provided in a separate device (hereinafter, referred to as a mainframe device). In this case, the mainframe device and the display device may be configured to mutually exchange a video signal and an audio signal, based on wireless communication. The present disclosure relates to a wireless AV system or wireless display system of which a mainframe device and a display device are physically and/or electrically independent as described above and which mutually reproduces media, based on wireless communication.

Figure 1:
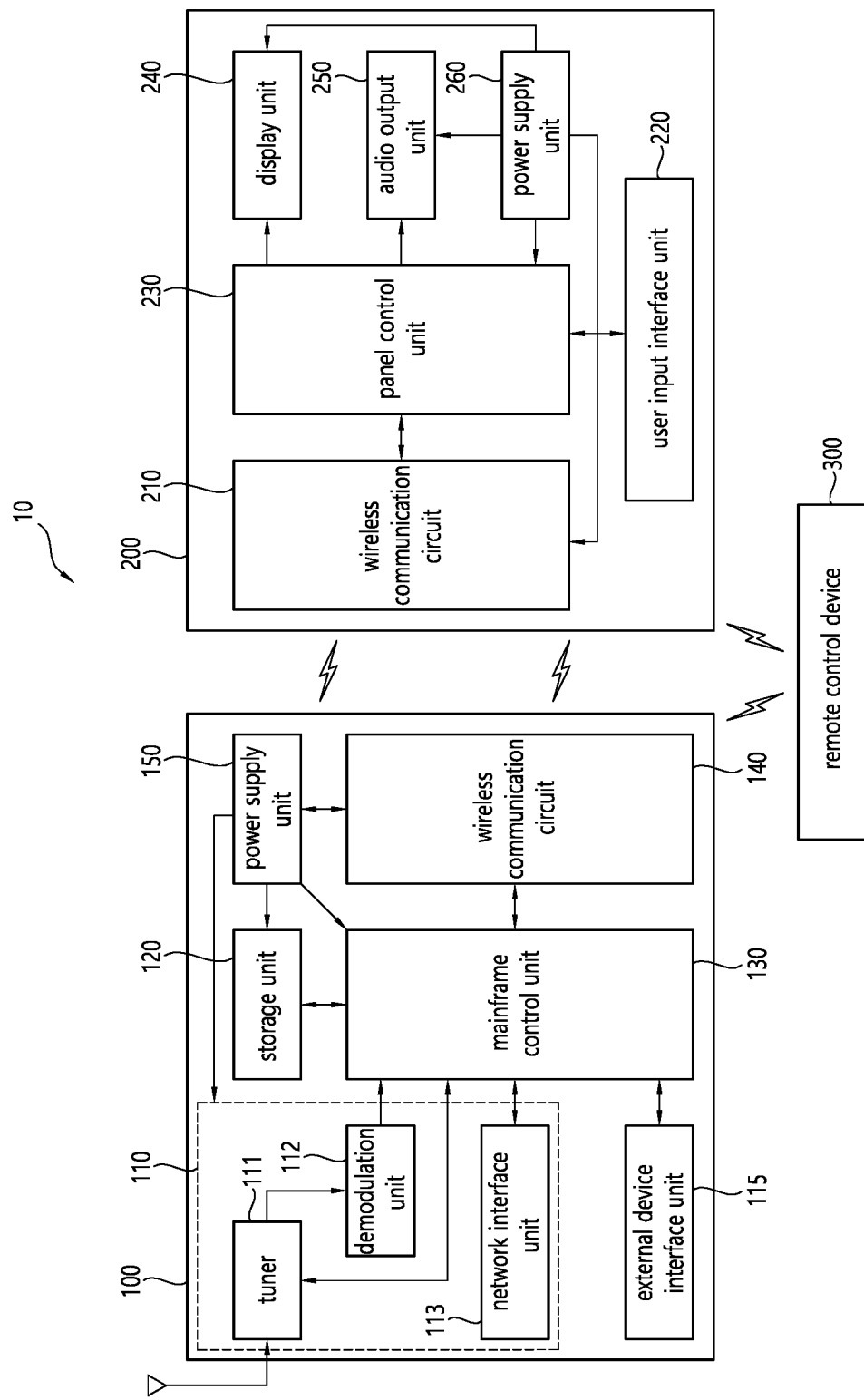
FIG. 1 is a block diagram of a wireless display system according to an embodiment.

FIG. 1 is a block diagram of a wireless AV system according to an embodiment.

Referring to FIG. 1, a wireless AV system 10 may include a mainframe device 100, a display device 200, and a remote control device 300.

The mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

In order to perform such an operation, the mainframe device 100 may include an external signal receiving unit 110, an external device interface unit 115, a storage unit 120, a mainframe control unit 130, a wireless communication circuit 140, and a power supply unit 150.

The external signal receiving unit 110 may include a tuner 111, a demodulation unit 112, and a network interface unit 113.

The tuner 111 receives a wired/wireless-type external signal related to audios, videos, pictures, images, multimedia, or at least one combination thereof. For example, the tuner 111 may select a specific broadcast channel according to a channel selection command and receive a broadcast signal for the selected specific broadcast channel.

The demodulation unit 112 may separate the received external signal into a video signal, an image signal, a picture signal, an audio signal, a data signal related to a broadcast program, or the like, and may restore the separated video signal, image signal, picture signal, audio signal, data signal related to the broadcast program, or the like into a format which can be output.

The external device interface unit 115 may receive an application or an application list in an adjacent external device and transmit it to the mainframe control unit 130 or the storage unit 120.

The external device interface unit 115 may provide a connection path between the mainframe device 100 and the external device. The external device interface unit 115 may receive one or more of audios, videos, pictures, images, multimedia, and at least one combination thereof output from the external device coupled in a wireless or wired manner to the mainframe device 100, and may transfer it to the mainframe control unit 130. The external device interface unit 115 may include a plurality of external input terminals. The plurality of external input terminals may include an RGB terminal, one or more high definition multimedia interface (HDMI) terminals, and a component terminal.

The external device that can be coupled with the external device interface unit 115 may be any one of a set-top box, a Blu-ray player, a DVD player, a game device, a sound bar, a smartphone, a PC, a USB memory, and a home theater, but this is for exemplary purposes only.

The network interface unit 113 may provide an interface for coupling the mainframe device 100 to a wired/wireless network including an Internet network. The network interface unit 113 may transmit or receive data with another user or another electronic device through an accessed network or another network linked to the accessed network.

In addition, part of content data stored in the mainframe device 100 may be transmitted to a selected user or a selected electronic device among the pre-stored other users or other electronic devices.

The network interface unit 113 may access a predetermined webpage through the accessed network or another network linked to the accessed network. That is, data can be transmitted or received with a corresponding server by accessing the predetermined webpage through the network.

In addition, the network interface unit 113 may receive content or data provided by a content provider or a network operator. That is, the network interface unit 113 may receive content such as movies, advertisements, games, VODs, broadcast signals, or the like provided from the content provider or the network operator through the network, and information related to the content.

In addition, the network interface unit 113 may receive update information and update files of firmware provided by the network operator, and may transmit data to the Internet or content provider or the network operator.

The network interface unit 113 may select and receive a desired application among applications open to the public through the network.

The storage unit 120 may store a program for processing and controlling each signal in the mainframe control unit 130, and may store signal-processed video, audio, or data signals.

In addition, the storage unit 120 may perform a function for temporarily storing a picture, audio, or data signal input from the external device interface unit 115 or the network interface unit 113, and may store information related to a predetermined image through a channel memory function.

The storage unit 120 may store an application or an application list input from the external device interface unit 115 or the network interface unit 113.

The mainframe control unit 130 may control the mainframe device 100 by a user command or internal program input through the remote control device 300, and may access the network to download an application desired by a user or an application list into the mainframe device 100.

The mainframe control unit 130 may allow channel information or the like selected by the user to be output through the display device 200 or an audio output unit 250 together with the processed picture or audio signal.

In addition, the mainframe control unit 130 may allow a picture signal or an audio signal, provided from an external device, for example, a camera or a camcorder, input through the external device interface unit 115, to be output through the display device 200 or the audio output unit 250, according to an external device picture playback command received through the remote control device 300.

In addition, the mainframe control unit 130 may provide control to reproduce content stored in the storage unit 120, broadcast content received, and external input content which is input from the outside. The content may have various formats such as a broadcast picture, an external input picture, an audio file, a still picture, an accessed web screen, a text file, or the like.

The mainframe control unit 130 may perform an operation of decoding data or the like related to a video, image, picture, audio, and broadcast program input through the demodulation unit 112, the external device interface unit 115, or the storage unit 120, encoding again the decoded data in accordance with an encoding/decoding scheme supported by the display device 200, generating a data stream or a bit stream by processing data through various picture/audio processing schemes such as compression or encoding so that the encoded data is transmitted through a wireless channel, and transmitting the generated data stream or bit stream to the display device 200 through the wireless communication circuit 140. According to an embodiment, the mainframe control unit 130 may transmit the decoded data again to the display device 200 directly through the wireless communication circuit 140 by bypassing the decoded data without having to encode it in accordance with the encoding/decoding scheme supported by the display device 200.

In addition, the mainframe control unit 130 may be configured to implement functions, procedures, and/or methods of a processor 1130 of a wireless data transmitting device 1100 described in each embodiment of the present specification. Layers of a wireless interface protocol may be implemented in the processor 1130.

The wireless communication circuit 140 is operatively coupled with the mainframe control unit 130 to receive a data stream or a bit stream from the mainframe control unit 130, generates a wireless stream by encoding and/or modulating the data stream or the bit stream so that it can be transmitted through a wireless channel, and transmits the wireless stream to the display device 200. The wireless communication circuit 140 establishes a wireless link, and the mainframe device 100 and the display device 200 are coupled by means of the wireless link. The wireless communication circuit 140 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 140 may perform communication using a communication protocol such as the IEEE 802.11 series standard.

The power supply unit 150 supplies power to the external signal receiving unit 110, the external device interface unit 115, the storage unit 120, the mainframe control unit 130, and the wireless communication circuit 140. A scheme in which the power supply unit 150 receives power from the outside may include a terminal scheme and a wireless scheme. When the power supply unit 150 receives power in a wireless manner, the power supply unit 150 may include a separate component for wirelessly receiving power. For example, the power supply unit 150 may include a power pick-up unit configured to receive wireless power by magnetic coupling with an external wireless power transmitting device, and a separate communication and control unit configured to perform communication with the wireless power transmitting device and control transmission and reception of wireless power.

The wireless communication circuit 140 may also be wirelessly coupled with the remote control device 300 to transfer a signal input by the user to the mainframe control unit 130 or transfer a signal from the mainframe control unit 130 to the user. For example, according to various communication schemes such as Bluetooth, ultra wideband (WB), Zigbee, a radio frequency (RF) communication scheme, or an infra-red (IR) communication scheme, the wireless communication circuit 140 may receive from the remote control device 300 a control signal such as power on/off, screen setting, or the like of the mainframe device 100, or may transmit the control signal from the mainframe control unit 130 to the remote control device 300.

In addition, the wireless communication circuit 140 may transfer to the mainframe control unit 130 a control signal input from a local key (not shown) such as a power key, a volume key, a set value, or the like.

Next, the display device 200 may perform a display or audio output operation after processing a wireless stream received from the mainframe device 100 through a wireless interface according to a reverse process of signal processing performed by the mainframe device 100. In order to perform such an operation, the display device 200 may include a wireless communication circuit 210, a user input interface unit 220, a panel control unit 230, a display unit 240, an audio output unit 250, and a power supply unit 260.

The wireless communication circuit 210 is coupled with the wireless communication circuit 140 of the mainframe device 100 through a wireless link to perform wireless communication with the wireless communication circuit 130 of the mainframe device 100. Specifically, the wireless communication circuit 210 receives a wireless stream from the wireless communication circuit 140 of the mainframe device 100, demodulates the wireless stream, and transmits the demodulated wireless stream to the panel controller 230. The wireless communication circuit 210 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 210 may perform communication using a communication protocol such as the IEEE 802.11 series standard, e.g., IEEE 802.11ay.

The panel control unit 230 decodes a signal demodulated by the wireless communication circuit 210 to restore a bit stream or a data stream. In this case, when the bit stream or data stream is compressed, the panel controller 230 performs an operation of decompressing or restoring the bit stream or data stream, and then outputs signals such as a video signal, an image signal, a picture signal, an audio signal, and a data signal related to a broadcast program. The signals may be sent to the display unit 240, the audio output unit 250, and the user input interface unit 220.

The video signal, the picture signal, the image signal, or the like may be input to the display unit 240 and may be displayed as a picture corresponding to the picture signal. In addition, a picture signal processed by the panel control unit 230 may be transmitted again to the mainframe device 100 through the wireless communication circuit 210, and may be input to an external output device through the external device interface unit 115 of the mainframe device 100.

An audio signal processed by the panel controller 230 may be output to the audio output unit 250. In addition, the audio signal processed by the panel control unit 230 may be transmitted again to the mainframe device 100 through the wireless communication circuit 210, and may be input to the external output device through the external device interface unit 115 of the mainframe device 100.

Meanwhile, the panel control unit 230 may control the display unit 240 to display a picture, for example, may provide control such that a broadcast picture input through the tuner 111, an external input picture input through the external device interface unit 115, a picture input through the network interface unit, or a picture stored in the storage unit 120 is displayed on the display unit 240. In this case, the picture displayed on the display unit 240 may be a still picture or a moving picture, and may be a 2D picture or a 3D picture.

The panel controller 230 may be configured to implement functions, procedures, and/or methods of a processor 1230 of a wireless data receiving device 1200 described in each embodiment of the present specification. In addition, the processor 1230 may be configured to implement functions, procedures, and/or methods of the wireless data receiving device 1200 described in each embodiment of the present specification.

The user input interface 220 may transfer a signal input by the user to the panel control unit 230 or transfer a signal from the panel control unit 230 to the user. For example, according to various communication schemes such as Bluetooth, ultra wideband (WB), Zigbee, a radio frequency (RF) communication scheme, or an infra-red (IR) communication scheme, the user input interface unit 220 may receive from the remote control device 300 a control signal such as power on/off, screen setting, or the like of the display device 200, or may transmit the control signal from the panel control unit 230 to the remote control device 300.

In addition, the user input interface unit 220 may transfer to the panel control unit 230 a control signal input from a local key (not shown) such as a power key, a volume key, a set value, or the like.

The power supply unit 150 supplies power to the wireless communication circuit 210, the user unit interface unit 220, the panel control unit 230, the display unit 240, and the audio output unit 250. A scheme in which the power supply unit 260 receives power from the outside may include a terminal scheme and a wireless scheme. When the power supply unit 260 receives power in a wireless manner, the power supply unit 260 may include a separate component for wirelessly receiving power. For example, the power supply unit 260 may include a power pick-up unit configured to receive wireless power by magnetic coupling with an external wireless power transmitting device, and a separate communication and control unit configured to perform communication with the wireless power transmitting device and control transmission and reception of wireless power.

The remote control device 300 performs an operation in which the mainframe device 100 and/or the display device 200 remotely control power on/off, channel selection, screen setting, or the like, and may be referred to as a remote controller.

Meanwhile, since the mainframe device 100 and display device 200 of FIG. 1 are only one embodiment of the present specification, some of components illustrated herein may be integrated, added, or omitted according to specifications of the mainframe device 100 and display device 200 actually implemented. That is, if necessary, two or more components may be combined into one component, or one component may be subdivided into two or more components. In addition, a function performed in each block is for explaining the embodiments of the present disclosure, and a specific operation or device does not limit the scope of the present disclosure.

According to another embodiment of the present disclosure, unlike in FIG. 1, the mainframe device 100 does not include the tuner 111 and the demodulation unit 112, and may receive a picture through the network interface unit 113 or the external device interface unit 115 to reproduce the picture.

For example, the mainframe device 100 may be implemented by being divided into a picture processing device such as a set-top box or the like for receiving a broadcast signal or content according to various network services and a content reproducing device for reproducing content input from the picture processing device.

In this case, a method of operating the wireless AV system 10 according to an embodiment of the present disclosure to be described below may be performed by not only the mainframe device 100 and the display device 200 as described with reference to FIG. 1 but also any one of a picture processing device such as the separate set-top box or the like and a content reproducing device having the audio output unit 250.

In terms of system input/output, the mainframe device 100 may be referred to as a wireless source device which provides a source wirelessly, and the display device 200 may be referred to as a wireless sink device which receives the source wirelessly. The wireless source device and the wireless sink device may implement wireless display (WD) communication techniques compatible with standards such as wireless HD, wireless home digital interface (WHDI), WiGig, wireless USB, and Wi-Fi display (WFD) (also known as Miracast).

In terms of an application, the mainframe device 100 may be integrated in a form of constituting part of a wireless set-top box, a wireless gaming console, a wireless digital video disk (DVD) player, and a wireless writer. In this case, the mainframe device 100 may be provided in a form of a wireless communication module or chip. In addition, the display device 200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the display device 200 may be provided in a form of a wireless communication module or chip.

The mainframe device 100 and the display device 200 may be integrated in a form of constituting part of a mobile device. For example, the mainframe device 100 and the display device 200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the mainframe device 100 and the display device 200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

As described above, the mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

Hereinafter, the picture/video/audio data transmitted through the wireless interface is collectively referred to as wireless data. That is, the mainframe device 100 may communicate wirelessly with the display device 200 and transmit wireless data. Therefore, in terms of a wireless data transceiving system 1000, the mainframe device 100 may be referred to as the wireless data transmitting device 1100, and the display device 200 may be referred to as the wireless data receiving device 1200. Hereinafter, the present disclosure will be described in greater detail in terms of the wireless data transceiving system 1000. First, a detailed block diagram of the wireless data transceiving system 1000 is disclosed.

Figure 2:
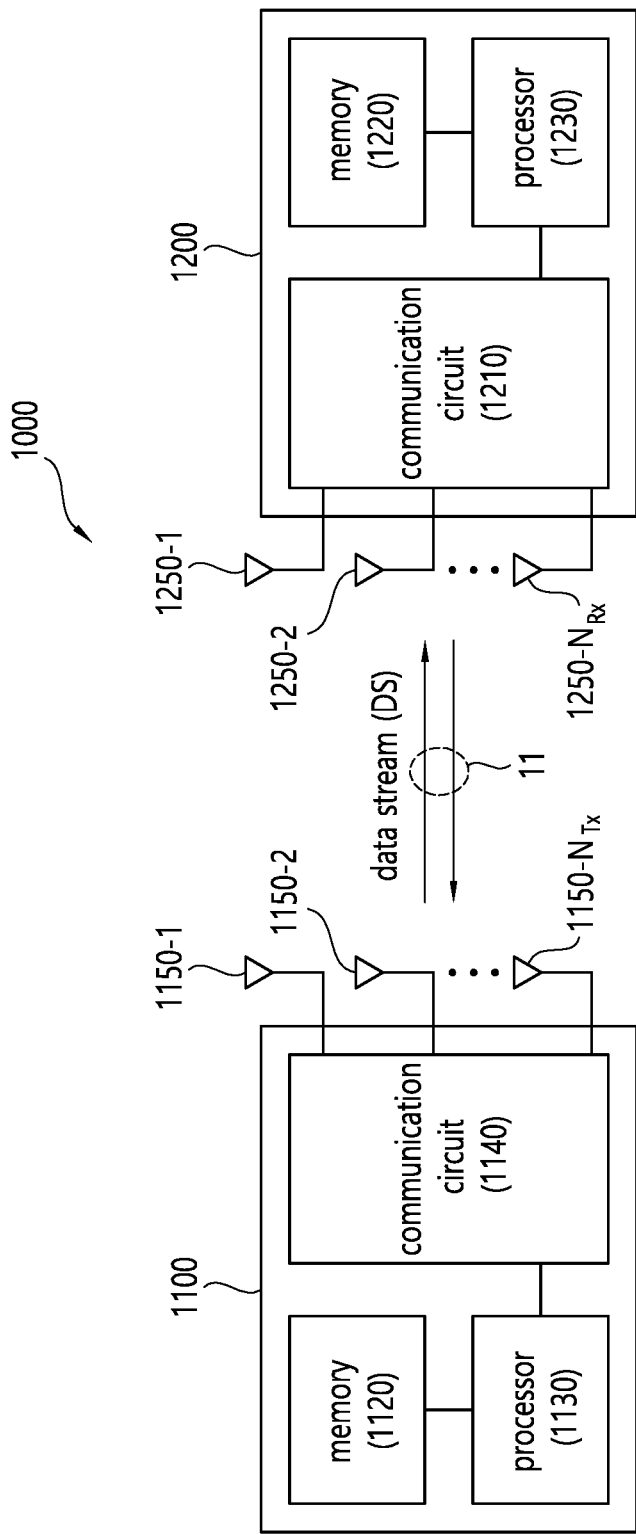
FIG. 2 is a block diagram of a wireless data transceiving system according to an embodiment.

FIG. 2 is a block diagram of a wireless data transceiving system according to an embodiment.

Referring to FIG. 2, the wireless data transceiving system 1000 refers to a system for transmitting and receiving a data stream wirelessly, and includes the wireless data transmitting device 1100 and at least one wireless data receiving device 1200. The wireless data transmitting device 1100 is communicatively coupled with the at least one wireless data receiving device 1200.

In terms of a wireless communication system (i.e., WLAN, WiFi), the wireless data transmitting device 1100 may be referred to as an AP or a personal basic service set control point (PCP) station, and the wireless data receiving device 1200 may be referred to as an STA or a non-PCP station.

In terms of input/output of a data stream, the wireless data transmitting device 1100 may be referred to as a wireless source device which provides a source wirelessly, and the wireless data receiving device 1200 may be referred to as a wireless sink device which receives the source wirelessly. The wireless source device and the wireless sink device may implement wireless display (WD) communication techniques compatible with standards such as wireless HD, wireless home digital interface (WHDI), WiGig, wireless USB, and Wi-Fi Display (WFD) (also known as Miracast).

In terms of an application, the wireless data transmitting device 1100 may be integrated in a form of constituting part of a wireless set-top box, a wireless gaming console, a wireless digital video disk (DVD) player, and a wireless writer. In this case, the wireless data transmitting device 1100 may be provided in a form of a wireless communication module or chip. In addition, the wireless data receiving device 1200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the wireless data receiving device 1200 may be provided in a form of a wireless communication module or chip.

The wireless data transmitting device 1100 and the wireless data receiving device 1200 may be integrated in a form of constituting part of a mobile device. For example, the wireless data transmitting device 1100 and the wireless data receiving device 1200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the wireless data transmitting device 1100 and the wireless data receiving device 1200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

In an aspect, data may include audios, videos, pictures, images, and multimedia, or may be constructed of at least one combination thereof.

In another aspect, the data may include a bit stream of an audio-compressed format, a bit stream of a video-compressed format, a bit stream of a picture-compressed format, and a bit stream of a multimedia-compressed format, or may include at least one combination thereof. In this case, the wireless data transceiving system 1000 may also be referred to as a wireless compressed data stream transceiving system. In addition, the wireless compressed data stream transceiving system 1000 may further include a functional or physical unit for compressing data.

Regarding a detailed structure of each device, the wireless data transmitting device 1100 includes a memory 1120, a processor 1130, a communication circuit 1140, and a plurality of antennas 1150-1, 1150-2, . . . , 1150-$N_{Tx}$, and the wireless data receiving device 1200 includes a communication circuit 1210, a memory 1220, a processor 1230, and a plurality of antennas 1250-1, 1250-2, . . . , 1250-$N_{Rx}$.

The memories 1120 and 1220 are operatively coupled to the processors 1130 and 1230, and store a variety of information for operating the processors 1130 and 1230. The memories 1120 and 1220 may include a read-only memory (ROM), a random access memory (RAM), a flash memory, a memory card, a storage medium, and/or other equivalent storage devices.

The processor 1130 may be configured to implement functions, procedures, and/or methods of the wireless data transmitting device 1100 described in each embodiment of the present specification. In addition, the processor 1230 may be configured to implement functions, procedures, and/or methods of the wireless data receiving device 1200 described in each embodiment of the present specification. Layers of the wireless interface protocol may be implemented in the processors 1130 and 1230.

In terms of the display system of FIG. 1, the processor 1130 may be configured to perform a function of the mainframe control unit 130. For example, the processor 1130 may perform an operation of decoding data or the like related to a video, image, picture, audio, and broadcast program input through the demodulation unit 112, the external device interface unit 115, or the storage unit 120, generating a data stream or a bit stream by processing data through various picture/audio processing schemes such as compression or encoding so that the decoded data is transmitted through a wireless channel, and transmitting the generated data stream or bit stream to the display device 200 through the communication circuit 1140.

The processors 1130 and 1230 may include application-specific integrated circuits (ASICs), other chipsets, logic circuits, and/or data processors.

When the embodiment is implemented in software, the techniques explained in the present specification may be implemented with a module (i.e., procedure, function, etc.) for performing the functions explained in the present specification. The module may be stored in the memories 1120 and 1220 and may be performed by the processors 1130 and 2310. The memories 1120 and 1220 may be implemented inside the processors 1130 and 2310. Alternatively, the memories 1120 and 1220 may be implemented outside the processor 2310, and may be coupled to the processors 1130 and 1230 in a communicable manner by using various well-known means.

The communication circuits 1140 and 1210 may include a baseband circuit for processing a radio frequency signal. The communication circuits 1140 and 1210 are operatively coupled to the processors 1130 and 1230, and transmit and/or receive data wirelessly. A communication channel constituted by the communication circuits 1140 and 1210 may be a network communication channel. In this case, the communication circuits 1140 and 1210 may establish a tunneled direct link setup (TDLS) which is tunneled to avoid or reduce network congestion. The Wi-Fi direct and the TDLS are used to set up relatively short-range communication sessions. A communication channel constituting a radio link 11 may be a communication channel of a relatively short range, or may be a communication channel implemented using a physical channel structure such as Wi-Fi, Bluetooth, or the like which uses various frequencies such as 2.4 GHz, 3.6 GHz, 5 GHz, 60 GHz, or ultra wide band (UWB).

Although techniques disclosed in the present specification may be primarily described in association with a communication protocol such as an IEEE 802.11 series standard, aspects of these techniques may also be compatible with other communication protocols. For example, the communication circuits 1140 and 1210 may be implemented based on various wireless communication schemes, such as short-range wireless communication, e.g., WI-FI, Bluetooth, NFC, and RFID, or a mobile communication network (e.g., 3G, 4G, 5G cellular network, etc.), or may perform communication by using a communication protocol such as the IEEE 802.11 series standard. By way of example and without limitation, wireless communication between the communication circuits 1140 and 1210 may use orthogonal frequency division multiplexing (OFDM) techniques. It is also possible to use various other wireless communication techniques including, but not limited to, time division multiple access (TDMA), frequency division multiple access (FDMA), code division multiple access (CDMA), or any combination of OFDM, FDMA, TDMA and/or CDMA.

Figure 3:
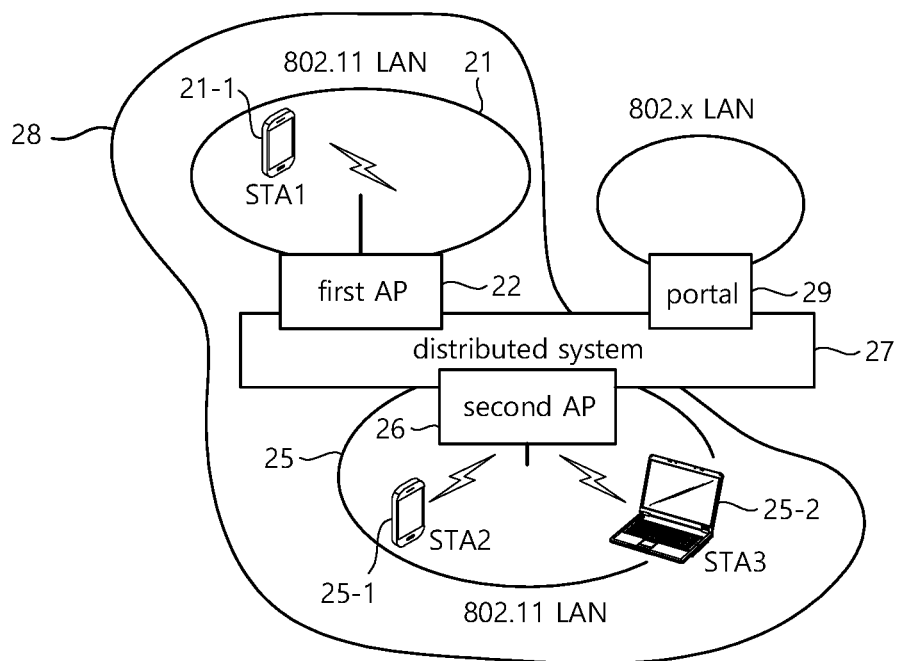
FIG. 3 is a conceptual diagram illustrating a case where a wireless data transceiving system is implemented with an IEEE 802.11 series communication protocol according to an embodiment.
Figure 3:
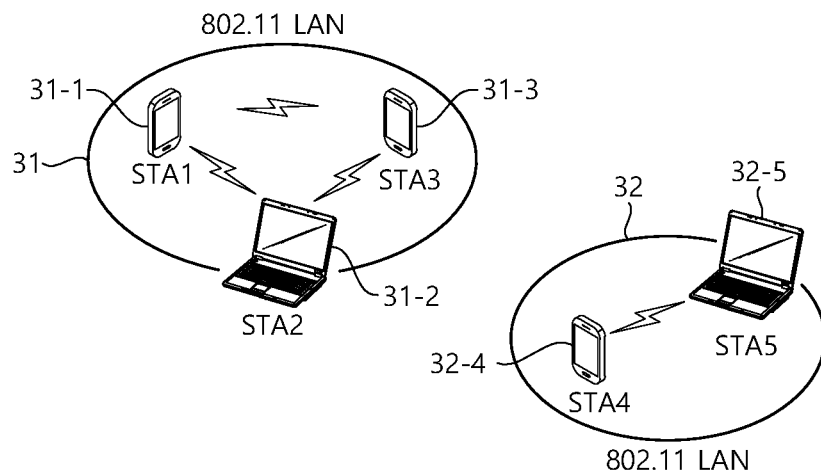

FIG. 3 is a conceptual diagram illustrating a case where a wireless data transceiving system is implemented with an IEEE 802.11 series communication protocol according to an embodiment.

Referring to FIG. 3, a wireless data transceiving system 20 of FIG. 3(A) may include one or more basic service sets (hereinafter, referred to as 'BSSs') 21 and 25. The BSS is a set of access points (hereinafter, APs) and stations (hereinafter, STAs) that can successfully synchronize and communicate with each other and is not a concept indicating a specific region.

For example, the first BSS 21 may include a first AP 22 and one first STA 21-1. The second BSS 25 may include a second AP 26 and one or more STAs 25-1 and 25-2. Herein, the first AP 22 may correspond to the communication circuit 1140 of FIG. 2, and the one or more STAs 25-1 and 25-2 may correspond to the communication circuit 1210 of FIG. 2.

The infrastructure BSSs 21 and 25 may include at least one STA, the APs 22 and 26 providing a distribution service, and a distribution system 27 for connecting the plurality of APs.

The distribution system 27 may connect the plurality of BSSs 22 and 26 to implement an extended service set (hereinafter, 'ESS') 28. The ESS 28 may be used as a term indicating one network to which the one or more APs 22 and 26 are connected through the distribution system 27. At least one AP included in one ESS 28 may have the same service set identification (hereinafter, SSID).

A portal 29 may serve as a bridge for connecting the WLAN network (IEEE 802.11) with another network (e.g., 802.X).

In a WLAN having a structure as shown in FIG. 3(A), a network between the APs 22 and 26 and a network between the APs 22 and 26 and the STAs 21-1, 25-1, and 25-2 may be implemented.

Meanwhile, a wireless data transceiving system 30 of FIG. 3(B) may perform communication by setting a network between STAs without the APs 22 and 26, unlike FIG. 3(A). A network that performs communication by setting a network even between STAs without the APs 22 and 26 is defined to an ad-hoc network or an independent basic service set (hereinafter, 'BSS').

Referring to FIG. 3(B), the wireless data transceiving system 30 is a BSS that operates in an Ad-Hoc mode, i.e., IBSS. Since the IBSS does not include an AP, there is no centralized management entity. Therefore, in the wireless data transceiving system 30, STAs 31-1, 31-2, 31-3, 32-4, and 32-5 are managed in a distributed manner. Herein, the STAs 31-1, 31-2, 31-3, 32-4, and 32-5 may correspond to the communication circuit 1140 or communication circuit 1210 of FIG. 2.

All of the STAs 31-1, 31-2, 31-3, 32-4, and 32-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the institute of electrical and electronics engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

Figure 4:
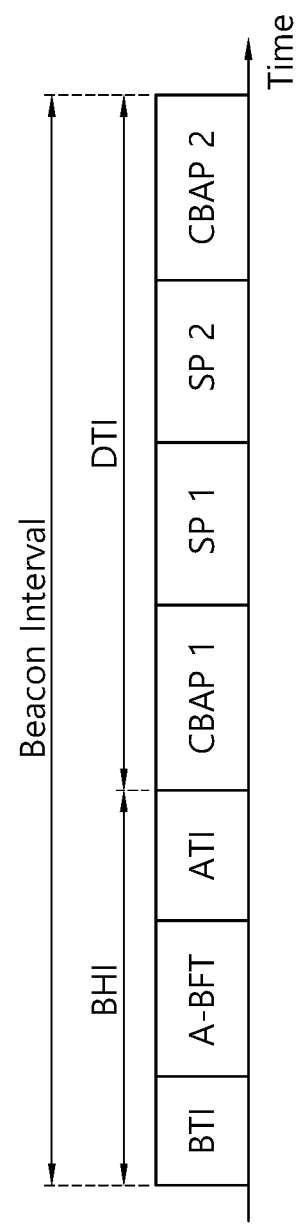
FIG. 4 is a diagram for describing a configuration of a beacon interval according to an embodiment.

FIG. 4 is a diagram for describing a configuration of a beacon interval according to an embodiment.

Referring to FIG. 4, in an enhanced directional multi-gigabit (EDMG) system, a time of media may be divided into beacon intervals. Sub-periods within the beacon interval may be referred to as an access period. Different access periods within one beacon interval may have different access rules. Information on the access period may be transmitted by an AP or a personal basic service set control point (PCP) to a non-AP STA or a non-PCP.

One beacon interval may include one beacon header interval (BHI) and one data transfer interval (DTI). As shown in FIG. 4, the BHI may include a beacon transmission interval (BTI), an association beamforming training (A-BFT), and an announcement transmission interval (ATI).

The BTI refers to a period in which one or more EDMG beacon frames can be transmitted. The A-BFT refers to a period in which beamforming training is performed by an STA which has transmitted the EDMG beacon frame during a preceding BTI. The ATI refers to a management access period based on request-response between the PCP/AP and the non-PCP/non-AP STA.

Meanwhile, a data transfer interval (DTI) is a period in which frame exchange is performed between STAs. One or more contention based access periods (CBAPs) and one or more service periods (SPs) may be allocated as shown in FIG. 4. Although an example in which 2 CBAPs and 2 SPs are allocated is shown in FIG. 4, this is for exemplary purposes only, and the disclosure is not necessarily limited thereto.

Hereinafter, a physical layer configuration for data communication in a wireless AV system to which the present disclosure is applied will be described in detail.

Figure 5:
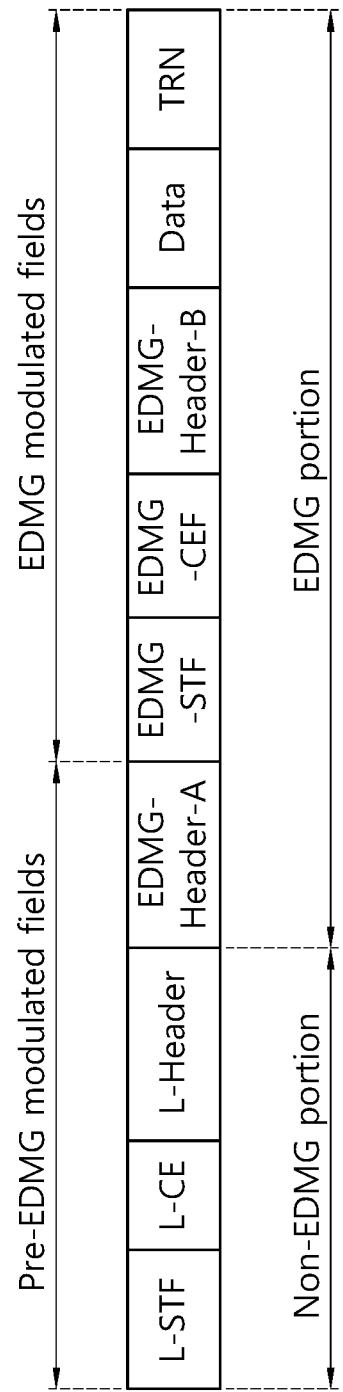
FIG. 5 is a diagram briefly illustrating a configuration of a physical protocol data unit (PPDU) frame according to an embodiment.

FIG. 5 is a diagram briefly illustrating a configuration of a physical protocol data unit (PPDU) frame according to an embodiment.

Referring to FIG. 5, the PPDU frame may include a legacy-short training field (L-STF), a legacy-channel estimated field (L-CEF), a legacy-header (L-header), an enhanced directional multi-gigabit-header A (EDMG-header A), an EDMG-STF, an DMG-CEF, an EDMG-header B, data, and TRN. These fields may be selectively included according to a PPDU type (e.g., SU PPDU, MU PPDU, etc.). The L-STF includes a training signal. The L-header may include control information for a first legacy station (e.g., a station supporting IEEE802.11ad). The EDMG-header may include control information for a second legacy station (e.g., a station supporting IEEE802.11ay). The EDMG-STF may include a training signal for the second legacy station.

Herein, control information fields (L-STF, L-CEF, L-header, EDMG header A, EDMG-STF, EDMG-CEF, EDMG-header B) of a physical layer added to a front end of data may be collectively referred to as a preamble. In addition, a part including the L-STF, L-CEF, and L-header fields may be referred to as a non-EDMG region, and the remaining parts may be referred to as an EDMG region. In addition, the L-STF, L-CEF, L-Header, and EDMG-Header-A fields may be referred to as pre-EDMG modulated fields, and the remaining parts may be referred to as EDMG modulated fields.

Returning to FIG. 2, a MIMO channel 11 may be constructed between the plurality of antennas 1150-1, 1150-2, ..., 1150-$N_{Tx}$ and the plurality of antennas 1250-1, 1250-2, ..., 1250-$N_{Rx}$, and data may be transmitted/received through the MIMO channel 11. Herein, each antenna may be referred to as a DMG antenna or an EDMG antenna.

Hereinafter, in order to implement the present specification, a few assumptions may be made. For example, each antenna may be operated by being connected to an individual RF chain. As another example, reciprocity between antennas may be considered.

A communication circuit (1140, 1210) configures a MIMO channel (11), and a wireless data transmitting device (1100) and a wireless data receiving device (1200) transmit and/or receive data through the MIMO channel (11). The communication circuit (1140, 1210) may perform beamforming (BF) or beamforming training related to MIMO based on multiple antennas (1150-1, 1150-2, ..., 1150-$N_{Tx}$, 1250-1, 1250-2, ..., 1250-$N_{Rx}$). The beamforming training relates to transmitting a BF training frame that uses sector sweep and providing necessary signaling to each STA in order to determine an appropriate antenna system setting.

Figure 6:
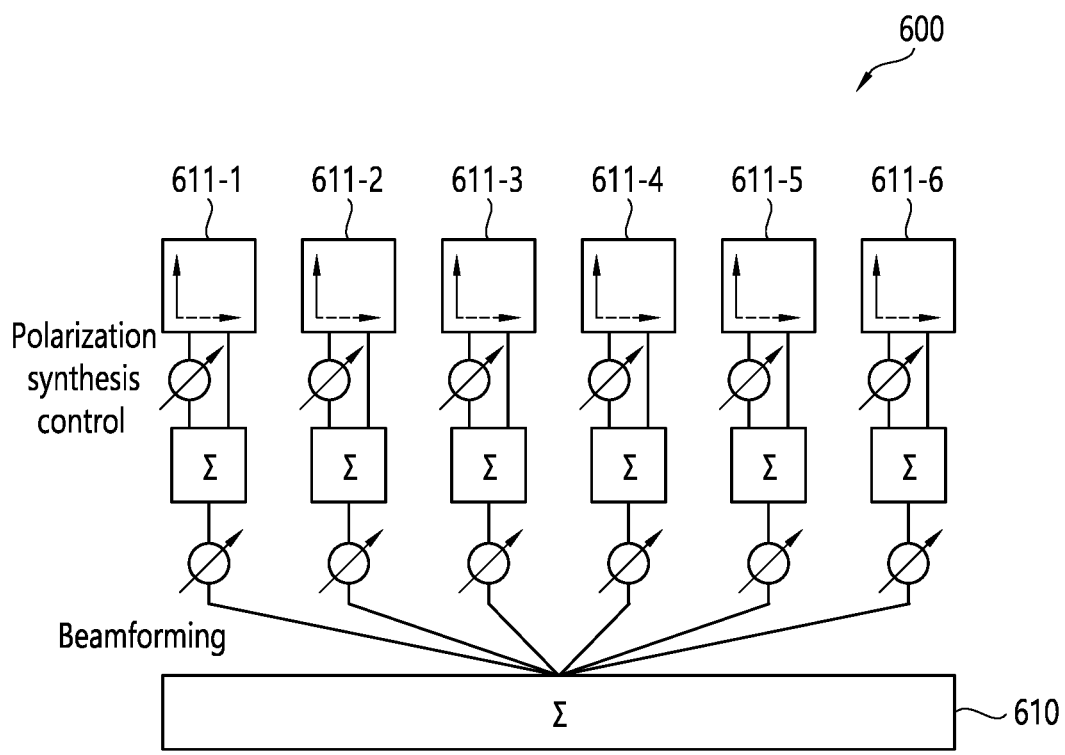
FIG. 6 shows multiple antennas having one RF chain being configured of a dual polarization array according to an embodiment of the present specification.
Figure 6:
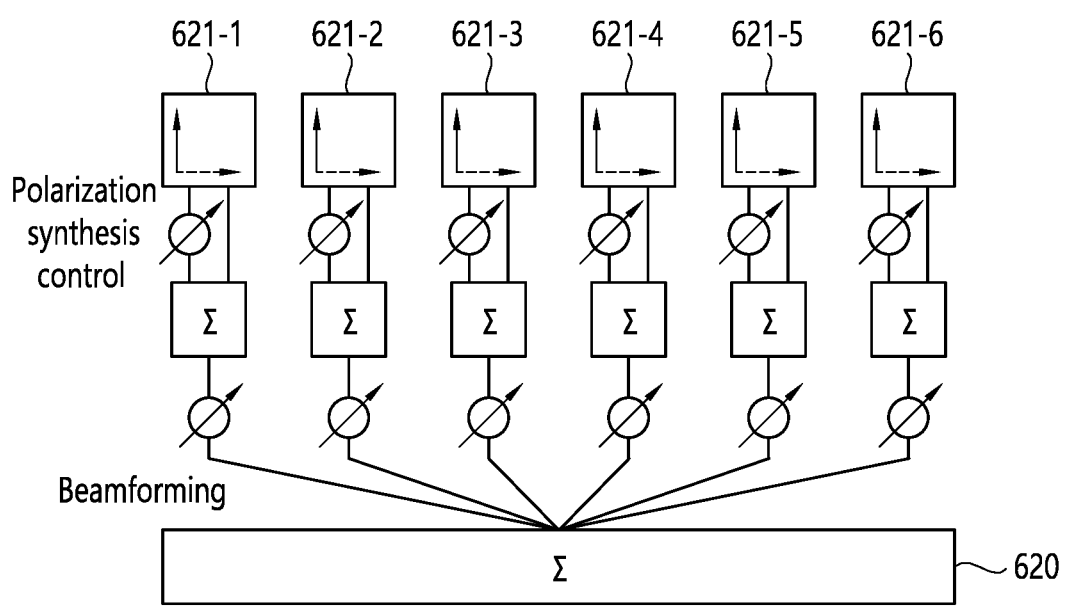

Multiple antennas (1150-1, 1150-2, ..., 1150-$N_{Tx}$, 1250-1, 1250-2, ..., 1250-$N_{Rx}$) may be antenna types being capable of performing polarization alignment and may, for example, include a configuration shown in FIG. 6.

FIG. 6 shows multiple antennas having one RF chain being configured of a dual polarization array according to an embodiment of the present specification.

Referring to FIG. 6, for example, multiple antennas (600) include two RF chains (610, 620) and dual polarization arrays (611-1, 611-2, ..., 611-6, 621-1, 612-2, ..., 612-6) being connected to each RF chain. One RF chain and a dual polarization array being connected to the one RF chain may be collectively referred to as a DMG antenna or simply referred to as an antenna. That is, a first RF chain (610) and a dual polarization array (611-1, 611-2, ..., 611-6) being connected thereto may be a first DMG antenna, and a second RF chain (620) and a dual polarization array (621-1, 621-2, ..., 621-6) being connected thereto may be a second DMG antenna.

A dual polarization array includes multiple dual polarization elements, and a dual polarization element may be referred to as a dual polarization antenna. For example, in linear polarization, the dual polarization element may perform polarization alignment by using poles of two directions, such as a horizontal pole and a vertical pole. Within one dual polarization element, when a signal is transmitted through the horizontal pole, no signal is transmitted through the vertical pole. And, conversely, when a signal is transmitted through the vertical pole, no signal is transmitted through the horizontal pole. As another example, in circular polarization, the dual polarization element may perform polarization alignment by using polarizations of two directions, such as a right-hand circular polarization and a left-hand circular polarization. Within one dual polarization element, when a signal is transmitted through the right-hand circular polarization, no signal is transmitted through the left-hand circular polarization. And, conversely, when a signal is transmitted through the left-hand circular polarization, no signal is transmitted through the right-hand circular polarization.

Each dual polarization element is connected to a polarization synthesis controller, and the polarization synthesis controller may control polarization alignment of the dual polarization element. Additionally, each polarization synthesis controller may be connected to a beamforming controller, and the beamforming controller may control beamforming of the dual polarization element. That is, an individual polarization synthesis controller and beamforming controller may be connected to each dual polarization element. The polarization synthesis controller and the beamforming controller may be configured as an integrated controller or module.

Although the present embodiment limits the number of RF chains to two RF chains and limits the number of dual polarization elements to six dual polarization elements, this is merely exemplary. And, therefore, the number of RF chains may be equal to 1 or 2 or more, and the number of dual polarization elements may be smaller or greater than 6.

Figure 7:
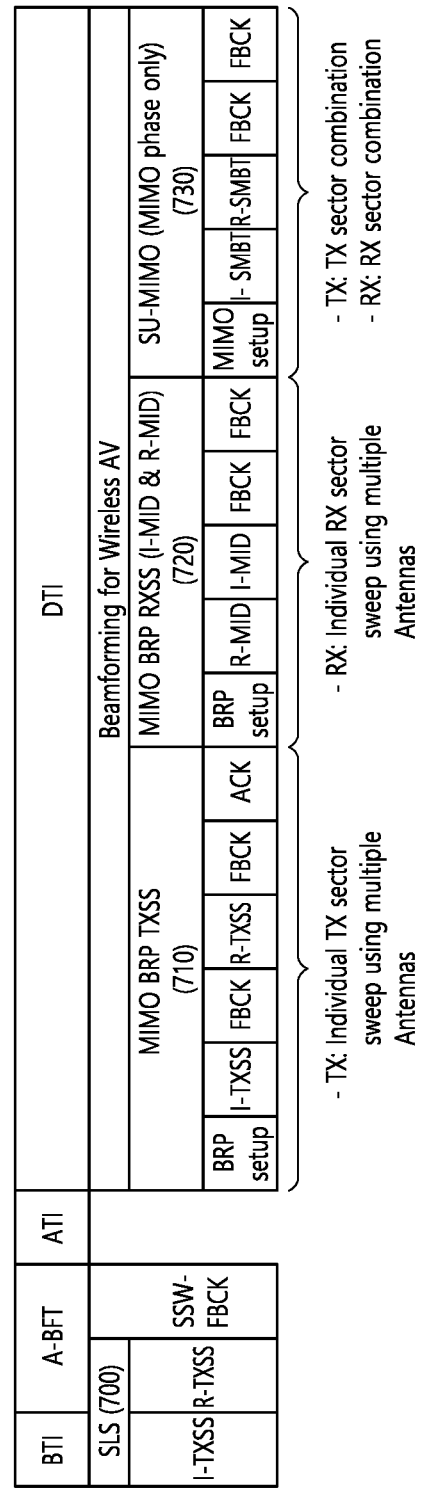
FIG. 7 shows a beamforming training process according to an embodiment of the present specification.

FIG. 7 shows a beamforming training process according to an embodiment of the present specification. This corresponds to an operation of the communication circuit (1140, 1210). Hereinafter, an STA that intends to transmit data through a beamforming operation will be referred to as an initiator, and an STA that receives data from the initiator will be referred to as responder. Additionally, a link from the initiator to the responder will be referred to as an initiator link, and a link from the responder to the initiator will be referred to as a responder link.

Referring to FIG. 7, the BF training process includes a Sector Level Sweep (SLS, 700) process selecting a coarse beam in sector units, and a Beam Refinement Protocol (BRP, 710, 720) process selecting a fine beam. That is, the BF training process starts with an SLS from the initiator.

The purpose of the SLS phase (700) is to enable communication between two STAs at a control PHY rate or higher MCS. Most particularly, the SLS phase (700) provides transmitting only BF training. In the SLS phase (700), a coarse transmission direction is determined by using a relatively wide beam. In this phase, a relatively small number of antenna elements may be used. Herein, a transmitter may operate in a Beamforming mode (Directional antenna mode), and a receiver may operate in a Quasi-omni antenna mode. The receiver may receiver a specific signal (e.g., preamble) and may, then, estimate a transmission beam of the transmitter. Therefore, STAs that intend to transmit and/or receive data may mutually know a transmission best sector or reception best sector for an initiator and a responder through the SLS phase (700).

At this point, the SLS phase (700) is a protocol performing link detection in a wireless AV system to which the present specification may be applied, and, herein, by having network nodes contiguously (or consecutively) transmit/receive frames including performance information of a reception channel link by changing only the beam direction, an indicator indicating an optimal frame, among the successfully received frames, may be a beam training scheme that selects the best beam direction.

Amore detailed description of the SLS phase (700) is as follows. The SLS Phase (700) may include Initiator TX Sector Sweep (I-TXSS) for training an initiator link, Responder TX Sector Sweep (R-TXSS) for training a responder link, SSW feedback (FBCK), and SSW ACK.

At this point, the initiator may start the SLS phase (700) by transmitting a frame (or frames) of the I-TXSS. The responder does not start the transmission of a frame (or frames) of the R-TXSS before the I-TXSS is successfully completed. However, a case where the I-TXSS occurs within a BTI may be excluded. The initiator may not start the SSW feedback before the R-TXSS phase is successfully completed. However, a case where the R-TXSS occurs within a A-BFT may be excluded. The responder does not start the SSW ACK of the initiator within the A-BFT. The responder may start the SSW ACK of the initiator immediately after the SSW feedback (FBCK) of the initiator has been successfully completed.

The BF frames being transmitted by the initiator during the SLS phase (700) may include an (EDMG) beacon frame, an SSW frame, and an SSW feedback frame. During the SLS process, the BF frames being transmitted by the responder may include an SSW frame and an SSW-ACK frame.

If each of the initiator and the responder performs TXSS during the SLS phase (700), at the end of the SLS phase (700), each of the initiator and the responder may possess its own transmit sector. If the I-TXSS or R-TXSS employs receive sector sweep, the responder or initiator may possess its own receive sector. An STA does not change its transmission power (or transport power) during sector sweep.

At this point, for example, in the above-described SLS Phase (700), the initiator and the responder may use a Short SSW frame. And, for this, the SSW feedback frame and the SSW ACK frame may need to be defined.

When a request is made by the initiator or responder, a Beam Refinement Protocol (or Beam Refinement Phase) (BRP) may be performed subsequent to the SLS phase (700).

The purpose of the BRP phase is to enable reception (RX) training and to enable iterative refinement of an Antenna Weight Vector (AWV) of all transmitters and receivers within all STAs. If one of the STAs participating in the beam training chooses to use a single transmission (TX) antenna pattern, the RX training may be performed as part of the SLS phase (700).

In the BRP phase, a transmission (TX)/reception (RX) beam combination is precisely determined by using a relatively narrow beam. The BRP phase may include a SISO phase and a MIMO phase. The BRP phase may use a relatively larger number of antenna elements as compared to the SLS phase (700) and may increase precision by iterative performance.

As described above, the SISO phase may be performed as a preceding procedure in order to reduce the load of the MIMO phase. And, therefore, the SISO phase may be optionally included in the BRP phase. In case the SISO phase is omitted (or skipped), the BRP phase may be regarded to be the same as the MIMO phase. And, in this case, the BRP phase may also be referred to as a MIMO phase. In the BRP phase, a status enabling minimum communication, such as transmission of a control packet, beacon, and so on, is established, and an optimal beam between the transmitter and the receiver is determined.

The present embodiment discloses a BRP phase in which the SISO phase is omitted (or skipped) or a MIMO phase.

The BRP TXSS according to the present embodiment may include at least one of MIMO BRP TXSS (710), MIMO BRP RXSS (720), and a SU-MIMO phase (730). That is, the BRP phase or MIMO phase according to the present embodiment may include at least one of MIMO BRP TXSS (710) as a first sub-phase, MIMO BRP RXSS (720) as a second sub-phase, and a SU-MIMO phase (730) as a third sub-phase.

The MIMO BRP TXSS (710) includes performing transmit sector training by having the wireless data transmitting device (1100) independently sweep or transmit a sector in parallel per TX antenna, without performing MIMO BRP TXSS (710) on all transmit sector combinations for multiple TX antennas. And, then, the wireless data transmitting device (1100) obtains transmit sector candidates per antenna. By doing so, time (of the SISO phase during MIMO BF) of the BRP TXSS may be shortened (or reduced).

The MIMO BRP RXSS (720) may provide information for selecting a candidate group of a receive sector combination that is to perform the MIMO phase. And, by doing so, the time of the MIMO phase may be reduced. Just as the MIMO BPR TXSS (710), the MIMO BRP RXSS (720) may include a phase independently performing receive sector training in parallel per RX antenna. And, a receive sector candidate may be derived per antenna through the MIMO BRP RXSS (720).

The SU-MIMO phase (730) includes a phase of deriving a best transmit-receive sector combination, among all of the transmit-receive sector combinations.

In the present specification, in light of polarization, reciprocity may mean that the polarization alignment of a first link is equally applied in a second link. Therefore, reciprocity being ensured may mean that, if polarization alignment is performed in the first link, polarization alignment does not need to be performed in the second link. Conversely, reciprocity not being ensured may mean that, even if polarization alignment is performed in the first link, polarization alignment needs to be performed once again in the second link. Whether or not reciprocity is ensured in light of polarization may depend upon a method of implementing a user equipment (UE). Therefore, the polarization alignment method may vary depending upon whether or not reciprocity is being ensured. Meanwhile, if the first link is a downlink, the second link in an uplink. And, if the first link is an uplink, the second link is a downlink. For example, a downlink may mean a communication link established in a direction from a PCP (or AP) to a non-PCP (or STA), and an uplink may mean a communication link established from a non-PCP (or STA) to a PCP (or AP).

Additionally, in the present specification, when one data transmitting device or one data receiving device uses multiple DMG antennas, it may be provided that each DMG antenna independently performs polarization alignment. This may relieve the restrictive conditions of implementation. And, most particularly, if the transmission directions from each DMG antenna are different, this may cause distortion in the independent polarization alignment.

The polarization alignment according to the present embodiment may be performed in any one of the detailed phases of the beamforming training process shown in FIG. 7. For example, the polarization alignment may be performed in the initial SLS phase (700). As another example, the polarization alignment may be performed in the MIMO BRP RXSS phase (720). As yet another example, apart from the detailed phases of the conventional (or existing) beamforming training process, the polarization alignment may also be performed in a new phase, which is provided for polarization alignment.

For polarization alignment, the data transmitting device may generate and transmit data fields being orthogonal to one another for each antenna. Herein, a data field may include a receive training field (TRN-R). The polarization alignment may be performed by a communication circuit (1140) of the data transmitting device (1100) and a data circuit (1210) of the data receiving device (1200).

For example, a data transmitting device being equipped with a first antenna and a second antenna transmits a first receive training field through the first antenna and transmits a second receive training field through the second antenna, wherein the first and second receive training fields may be orthogonal to one another. Due to the orthogonality between the receive training field each being transmitted through a different antenna, the receive training field may be differentiated from one another in the receiver. The generation and transmission of the first receive training field and the second receive training field may be performed by the communication circuit (1140).

Meanwhile, the data receiving device may receive the first receive training field and the second receive training field, which are orthogonal to one another, from a data transmitting device and may calculate an orthogonal alignment value for the first antenna and the second antenna based on the first receive training field and the second receive training field. The reception of the first receive training field and the second receive training field, which are orthogonal to one another, and the calculation of the orthogonal alignment value based on the received first and second receive training fields may be performed by the communication circuit (1210).

Figure 8:
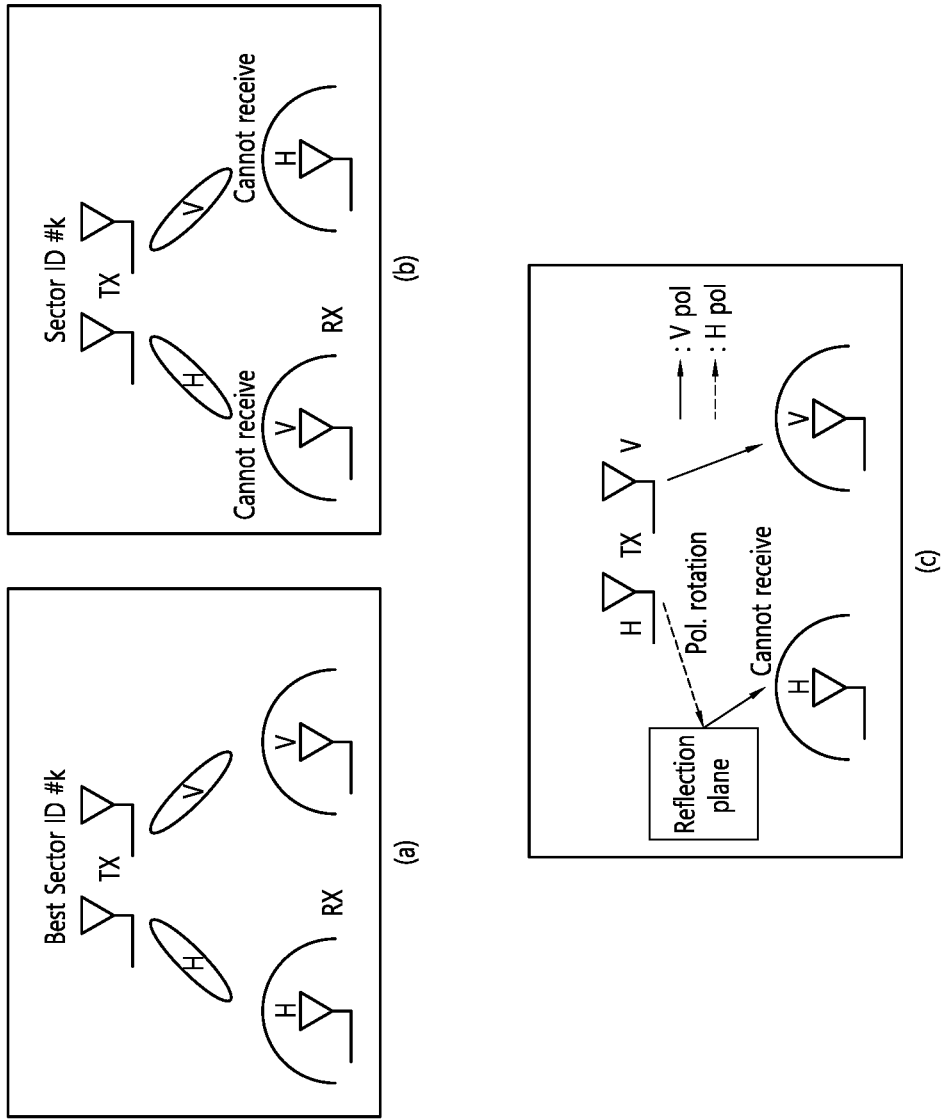
FIG. 8 is an example of performing polarization alignment in case the antennas of a data transmitting device and the antennas of the data receiving device each operates as a single pole according to an example of the present specification.
Figure 9:
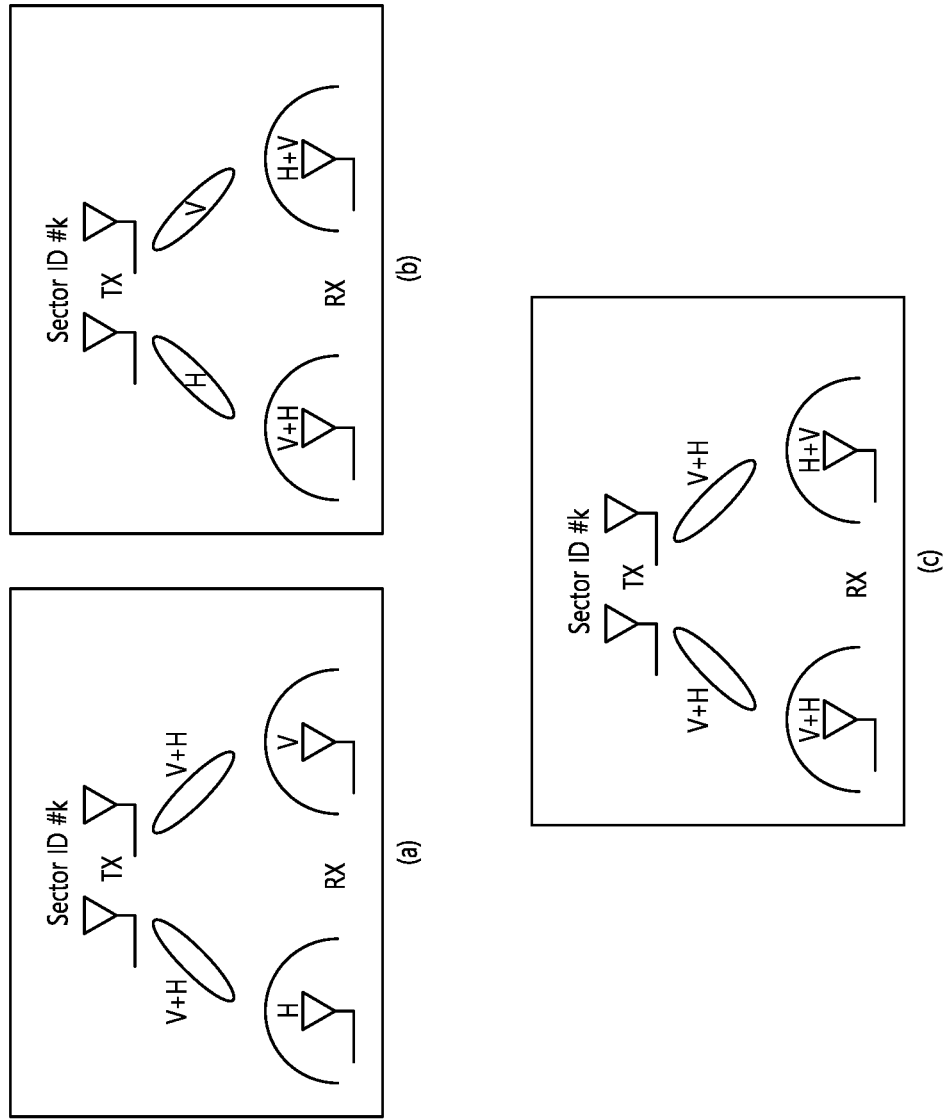
FIG. 9 is an example of performing polarization alignment in case the antennas of a data transmitting device and the antennas of the data receiving device each operates either as a single pole or as a dual pole according to another example of the present specification.

In the above-described orthogonal alignment process, the data transmitting device and the data receiving device may operate as one of a dual pole or single pole. For example, as shown in FIG. 8, the data transmitting device and the data receiving device may operate each antenna as a single pole by selecting one of a horizontal pole or a vertical pole (or a left-hand circular pole or a right-hand circular pole). Alternatively, as shown in FIG. 9, the data transmitting device and the data receiving device may optionally operate each antenna as single pole or as a dual pole (a mode in which the antenna operates as a horizontal pole and a vertical pole at the same time or a mode in which the antenna operates as a left-hand circular pole and a right-hand circular pole at the same time).

FIG. 8 is an example of performing polarization alignment in case the antennas of a data transmitting device and the antennas of the data receiving device each operates as a single pole according to an example of the present specification.

Referring to FIG. 8, (a) is a case where, in an optimal sector ID #k, a first transmission (TX) antenna operating as a horizontal pole (H) transmits a signal to a first reception (RX) antenna, which also operates as a horizontal pole (H), and a second transmission (TX) antenna operating as a vertical pole (V) transmits a signal to a second reception (RX) antenna, which also operates as a vertical pole (V). As described above, in case the polarization alignment is optimally carried out, a stable data transmission may be performed.

Conversely, (b) is a case where the data transmitting device and the data receiving device fail to find an optimal sector ID #k, and where a first transmission (TX) antenna operating as a horizontal pole (H) transmits a signal to a first reception (RX) antenna, which operates as a vertical pole (V), and a second transmission (TX) antenna operating as a vertical pole (V) transmits a signal to a second reception (RX) antenna, which operates as a horizontal pole (H). In this case, a problem may occur in control link setup.

Furthermore, (c) is a case where a first transmission (TX) antenna operating as a horizontal pole (H) transmits a signal to a first reception (RX) antenna, which also operates as a horizontal pole (H), and a second transmission (TX) antenna operating as a vertical pole (V) transmits a signal to a second reception (RX) antenna, which also operates as a vertical pole (V). However, in case the signal of the first transmission antenna is reflected by a reflector (or reflection plane) and then changes to a vertical pole (V) as the reflected signal reaches the first reception antenna, the first reception antenna fails to receive the signal. Thus, the polarization alignment for each antenna cannot be performed.

Although the present specification describes the dual pole by using an example of a horizontal pole (H) and a vertical pole (V), herein, for example, the horizontal pole may be replaced with a right-hand circular pole (R), and the vertical pole (V) may be replaced with a left-hand circular pole (L).

FIG. 9 is an example of performing polarization alignment in case the antennas of a data transmitting device and the antennas of the data receiving device each operates either as a single pole or as a dual pole according to an example of the present specification.

Referring to FIG. 9, (a) is a case where antennas of the data transmitting device operate as a single pole and antennas of the data receiving device also operate as a single pole. (b) is a case where antennas of the data transmitting device operate as a single pole and antennas of the data receiving device operate as a dual pole. And, (c) is a case where antennas of the data transmitting device and antennas of the data receiving device operate as a dual pole.

In the cases of (a) to (c), both of the data transmitting device and the data receiving device have no problem finding the optimal sector ID #k. And, therefore, no problem occurs in the control link setup.

However, it is preferable that transmission and reception using a dual pole (H+V) in one DMG antenna are performed only during the polarization alignment process, and, when performing transmission and reception afterwards, it is preferable that one DMG antenna operates as a single pole (H or V). This is to achieve gain by a polarization antenna. Therefore, under such premise, in case of (a) and (c), when the antennas of the data transmitting device are shifted from a dual pole to a single pole, the data receiving device is incapable of knowing which antenna is using what pole type. Therefore, as shown in (b), the case where the antennas of the data transmitting device are operated as a single pole and the antennas of the data receiving device are operated as a dual pole may be more appropriate for polarization alignment. Although the present specification describes the dual pole by using an example of a horizontal pole (H) and a vertical pole (V), herein, for example, the horizontal pole may be replaced with a right-hand circular pole (R), and the vertical pole (V) may be replaced with a left-hand circular pole (L).

Hereinafter, a data transmitting device and method and a data receiving device and method for performing polarization alignment according to an embodiment of the present specification will be disclosed.

Performing Polarization Alignment in an Initial SLS Phase

The data transmitting device and/or the data receiving device may perform polarization alignment in an initial SLS phase. Herein, in case the data transmitting device is a PCP (or AP) and the data receiving device is a non-PCP (or STA), the PCP and the non-PCP may perform polarization alignment in the initial SLS phase.

Figure 10:
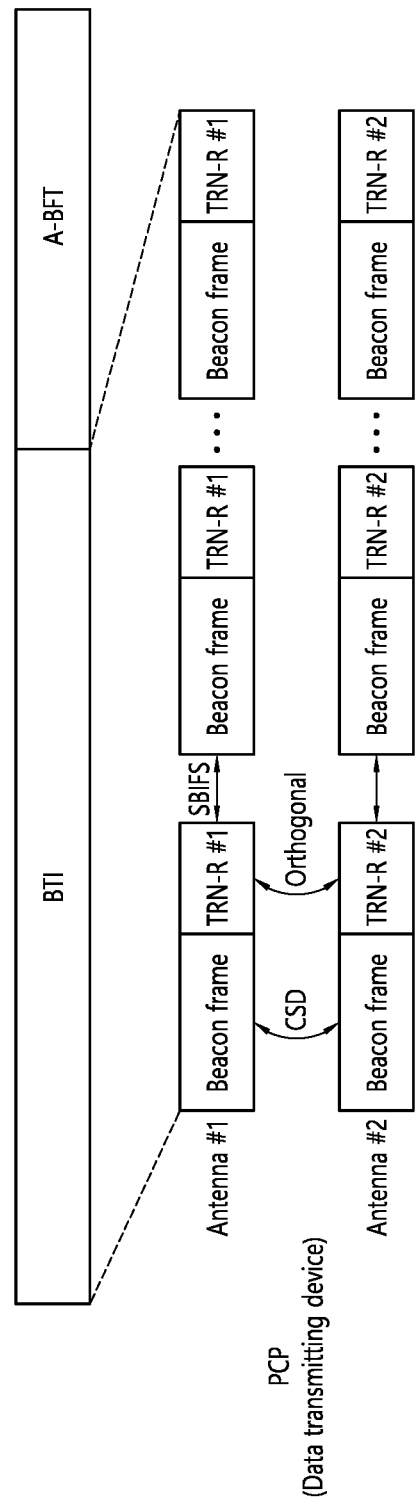
FIG. 10 is a diagram describing a method for performing polarization alignment in the initial SLS phase, in a case where reciprocity in polarization is ensured, according to an aspect of the present specification.

FIG. 10 is a diagram describing a method for performing polarization alignment in the initial SLS phase, in a case where reciprocity in polarization is ensured, according to an aspect of the present specification.

Referring to FIG. 10, in the initial SLS phase, the communication circuit (1140) of the data transmitting device (1100) may transmit, to the data receiving device (1200), receive training fields (TRN-Rs) being orthogonal to one another through different antennas within a BTI.

For example, the communication circuit (1140) of the data transmitting device (1100) transmits a beacon frame and a first receive training field (TRN-R #1), to the data receiving device (1200), through a first antenna (antenna #1) within a BTI. And, then, the communication circuit (1140) of the data transmitting device (1100) transmits a beacon frame and a second receive training field (TRN-R #2), to the data receiving device (1200), through a second antenna (antenna #2) within the same BTI. The transmission of the combination of a beacon frame and a receive training field may be repeated multiple times within a BTI. An EDMG PPDU may be used for the beacon frame, and an EDMG TRN may be used for the receive training field.

The first receive training field (TRN-R #1) and the second receive training field (TRN-R #2) are orthogonal to one another. For example, when generating the first receive training field (TRN-R #1) and the second receive training field (TRN-R #2), an orthogonal sequence for each receive training field may be used. Therefore, in the initial SLS phase, the communication circuit (1210) of the data receiving device (1200) may receive the first receive training field (TRN-R #1) and the second receive training field (TRN-R #2), which are orthogonal to one another, from the communication circuit (1140) of the data transmitting device (1100), and may calculate polarization alignment values of the first antenna (antenna #1) and the second antenna (antenna #2) based on the first receive training field (TRN-R #1) and the second receive training field (TRN-R #2). More specifically, by separately tuning a pole of the first antenna and a pole of the second antenna, the communication circuit (1210) of the data receiving device (1200) may find a polarization alignment value of each antenna that can best receive the first receive training field (TRN-R #1) and the second receive training field (TRN-R #2). Thus, the communication circuit (1140) of the data transmitting device (1100) and the communication circuit (1210) of the data receiving device (1200) may complete the polarization alignment for a downlink. The polarization alignment value may also be referred to as a polarization alignment tilting value or a polarization tilting value.

Meanwhile, in the present embodiment, since the reciprocity in polarization is ensured, if polarization alignment in a downlink is performed, the polarization alignment in an uplink may be skipped. That is, the communication circuit (1140) of the data transmitting device (1100) and the communication circuit (1210) of the data receiving device (1200) may skip the polarization alignment related to an uplink.

Figure 11:
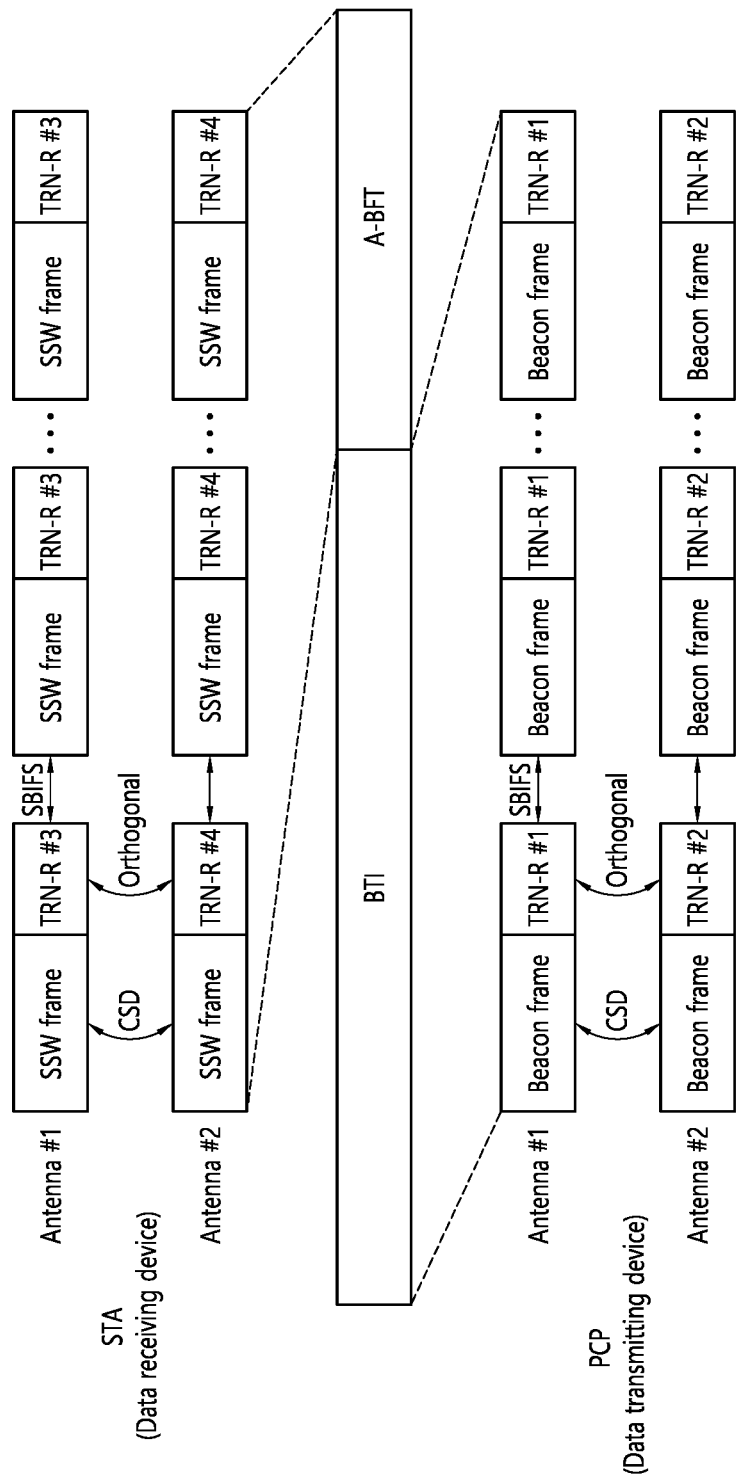
FIG. 11 is a diagram describing a method for performing polarization alignment, in a case where reciprocity in polarization is not ensured, according to another aspect of the present specification.

FIG. 11 is a diagram describing a method for performing polarization alignment, in a case where reciprocity in polarization is not ensured, according to another aspect of the present specification.

Referring to FIG. 11, in the initial SLS phase, the communication circuit (1140) of the data transmitting device (1100) may transmit, to the data receiving device (1200), receive training fields being orthogonal to one another through different antennas within a BTI.

For example, the communication circuit (1140) of the data transmitting device (1100) transmits a beacon frame and a first receive training field (TRN-R #1), to the data receiving device (1200), through a first antenna (antenna #1) within a BTI. And, then, the communication circuit (1140) of the data transmitting device (1100) transmits a beacon frame and a second receive training field (TRN-R #2), to the data receiving device (1200), through a second antenna (antenna #2) within the same BTI. The transmission of the combination of a beacon frame and a receive training field may be repeated multiple times within a BTI. An EDMG PPDU may be used for the beacon frame, and an EDMG TRN may be used for the receive training field.

The first receive training field (TRN-R #1) and the second receive training field (TRN-R #2) are orthogonal to one another. Therefore, in the initial SLS phase, the communication circuit (1210) of the data receiving device (1200) may receive the first receive training field (TRN-R #1) and the second receive training field (TRN-R #2), which are orthogonal to one another, from the communication circuit (1140) of the data transmitting device (1100), and may calculate polarization alignment values of the first antenna (antenna #1) and the second antenna (antenna #2) based on the first receive training field (TRN-R #1) and the second receive training field (TRN-R #2). More specifically, by separately tuning a pole of the first antenna and a pole of the second antenna, the communication circuit (1210) of the data receiving device (1200) may find a polarization alignment value of each antenna that can best receive the first receive training field (TRN-R #1) and the second receive training field (TRN-R #2) (e.g., a polarization alignment value that has the highest correlation in each antenna). Thus, the communication circuit (1140) of the data transmitting device (1100) and the communication circuit (1210) of the data receiving device (1200) may complete the polarization alignment for a downlink.

Meanwhile, in the present embodiment, since the reciprocity in polarization is not ensured, even if polarization alignment in a downlink is performed, the polarization alignment in an uplink shall also be performed.

For this, in the initial SLS phase, the communication circuit (1210) of the data receiving device (1200) may transmit, to the data transmitting device (1100), receive training fields being orthogonal to one another through different antennas within an A-BFT.

For example, the communication circuit (1210) of the data receiving device (1200) transmits an SSW frame and a third receive training field (TRN-R #3), to the data transmitting device (1100), through a first antenna (antenna #1) within an A-BFT. And, then, the communication circuit (1210) of the data receiving device (1200) transmits an SSW frame and a fourth receive training field (TRN-R #4), to the data transmitting device (1100), through a second antenna (antenna #2) within the same A-BFT. The transmission of the combination of an SSW frame and a receive training field may be repeated multiple times within an A-BFT. An EDMG PPDU may be used for the SSW frame, and an EDMG TRN may be used for the receive training field.

The third receive training field (TRN-R #3) and the fourth receive training field (TRN-R #4) are orthogonal to one another. Therefore, in the initial SLS phase, the communication circuit (1140) of the data transmitting device (1100) may receive the third receive training field (TRN-R #3) and the fourth receive training field (TRN-R #4), which are orthogonal to one another, from the communication circuit (1210) of the data receiving device (1200), and may calculate polarization alignment values of the first antenna (antenna #1) and the second antenna (antenna #2) based on the third receive training field (TRN-R #3) and the fourth receive training field (TRN-R #4). More specifically, by separately tuning a pole of the first antenna and a pole of the second antenna, the communication circuit (1140) of the data transmitting device (1100) may find a polarization alignment value of each antenna that can best receive the third receive training field (TRN-R #3) and the fourth receive training field (TRN-R #4). Thus, the communication circuit (1140) of the data transmitting device (1100) and the communication circuit (1210) of the data receiving device (1200) may complete the polarization alignment for an uplink.

Since the polarization alignment method according to the present embodiment is performed in the initial SLS phase, after the polarization alignment is completed, link quality related to the frames that are to be transmitted from ATI/DTI may not be ensured.

According to the present embodiment, an EDMG PPDU may be used for the beacon frame and the SSW frame, and an EDMG TRN may be used for the receive training field. And, in this case, the legacy devices (AP or STA) cannot recognize beacon information.

In the present embodiment, in case a number of sectors in a BTI is equal to N and a number of TRN subfields needed for the polarization alignment is equal to M, a total number of TRN subfields that are needed may be increased by N×M.

Performing Polarization Alignment in a MIMO BRP RXSS Phase

The data transmitting device and/or the data receiving device may perform polarization alignment in a MIMO BRP RXSS phase. Herein, in case the data transmitting device is a PCP (or AP) and the data receiving device is a non-PCP (or STA), the PCP and the non-PCP may perform polarization alignment in the MIMO BRP RXSS phase. Therefore, the polarization alignment of the present embodiment is individually (or separately) performed for each receive sector. In other words, the polarization alignment may vary for each receive sector.

Figure 12:
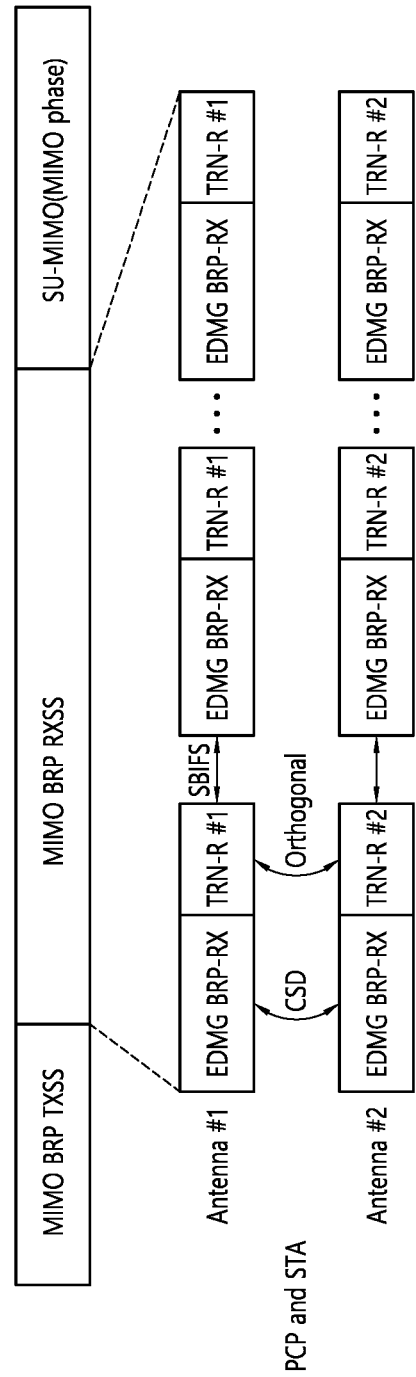
FIG. 12 is a diagram describing a method for performing polarization alignment in a MIMO BRP RXSS phase according to an aspect of the present specification.

FIG. 12 is a diagram describing a method for performing polarization alignment in a MIMO BRP RXSS phase according to an aspect of the present specification.

Referring to FIG. 12, in the MIMO BRP RXSS phase, the communication circuit (1140) of the data transmitting device (1100) may transmit, to the data receiving device (1200), receive training fields (TRN-Rs) being orthogonal to one another through different antennas within an EDMG BRP-RX packet.

For example, the communication circuit (1140) of the data transmitting device (1100) transmits an EDMG BRP-RX packet and a first receive training field (TRN-R #1), to the data receiving device (1200), through a first antenna (antenna #1) within the MIMO BRP RXSS phase. And, then, the communication circuit (1140) of the data transmitting device (1100) transmits an EDMG BRP-RX packet and a second receive training field (TRN-R #2), to the data receiving device (1200), through a second antenna (antenna #2) within the same MIMO BRP RXSS phase. The transmission of the combination of an EDMG BRP-RX packet and a receive training field may be repeated multiple times within the MIMO BRP RXSS phase.

The first receive training field (TRN-R #1) and the second receive training field (TRN-R #2) are orthogonal to one another. For example, when generating the first receive training field (TRN-R #1) and the second receive training field (TRN-R #2), an orthogonal sequence for each receive training field may be used. Although an orthogonal sequence is not required to be considered in MIMO BRP RXSS only for MIMO beamforming, for the polarization alignment according to the present embodiment, an orthogonal sequence is considered.

Therefore, in the MIMO BRP RXSS phase, the communication circuit (1210) of the data receiving device (1200) may receive the first receive training field (TRN-R #1) and the second receive training field (TRN-R #2), which are orthogonal to one another, from the communication circuit (1140) of the data transmitting device (1100), and may calculate polarization alignment values of the first antenna (antenna #1) and the second antenna (antenna #2) based on the first receive training field (TRN-R #1) and the second receive training field (TRN-R #2). Thus, the communication circuit (1140) of the data transmitting device (1100) and the communication circuit (1210) of the data receiving device (1200) may complete the polarization alignment for a downlink (or uplink). That is, in the MIMO BRP RXSS phase, the communication circuit (1140) of the data transmitting device (1100) and the communication circuit (1210) of the data receiving device (1200) perform receive sector sweep and polarization alignment at the same time.

Meanwhile, in the present embodiment, depending upon whether or not the reciprocity in polarization is ensured, only one of the BRP RXSS of the initiator or the BRP RXSS of the responder may be performed. For example, if the BRP RXSS of the initiator is performed together with the polarization alignment, the BRP RXSS and polarization alignment of the responder may be skipped. In case the number of TRN subfields needed for the receive sector sweep is equal to N and the number of TRN subfields needed for the polarization alignment is equal to M, a total number of TRN subfields that are needed in the BRP RXSS phase becomes equal to N×M.

Performing Polarization Alignment in a Polarization RXSS Phase

Apart from a sub-phase being performed in the conventional (or existing) beamforming training process, the data transmitting device and/or the data receiving device may perform polarization alignment in a new phase being configured (or allocated) for polarization alignment, i.e., a polarization RXSS phase. That is, a separate phase for polarization alignment is added in the DTI. Herein, in case the data transmitting device is a PCP (or AP) and the data receiving device is a non-PCP (or STA), the PCP and the non-PCP may perform polarization alignment in the polarization RXSS phase.

Figure 13:
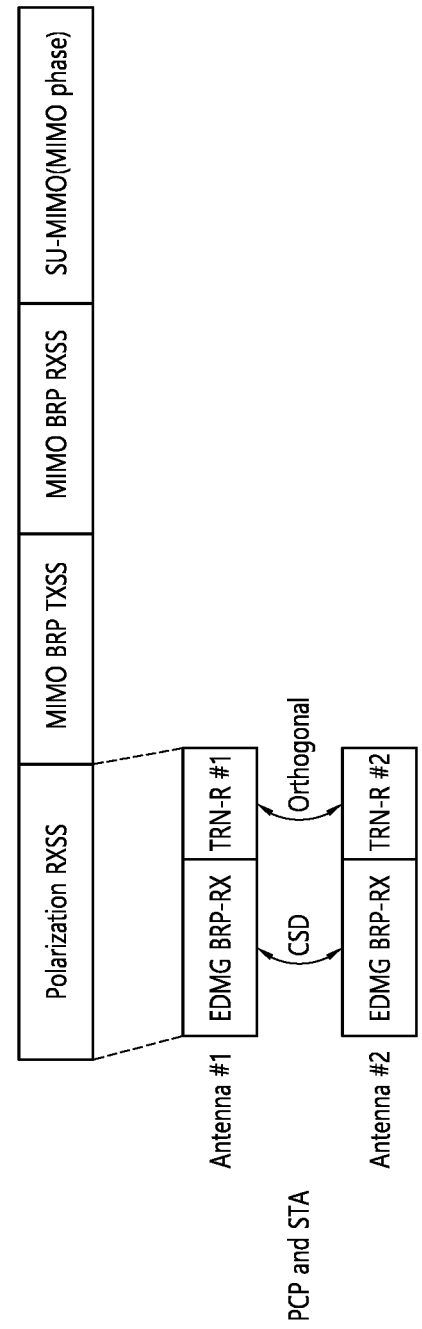
FIG. 13 is a diagram describing a method for performing polarization alignment in a polarization RXSS phase according to an aspect of the present specification.

FIG. 13 is a diagram describing a method for performing polarization alignment in a polarization RXSS phase according to an aspect of the present specification.

Referring to FIG. 13, in the polarization RXSS phase, the communication circuit (1140) of the data transmitting device (1100) may transmit, to the data receiving device (1200), receive training fields (TRN-Rs) being orthogonal to one another through different antennas within an EDMG BRP-RX packet. Herein, the polarization RXSS phase is included in the BRP phase, and may, for example, be performed before the MIMO BRP TXSS phase.

For example, the communication circuit (1140) of the data transmitting device (1100) transmits an EDMG BRP-RX packet and a first receive training field (TRN-R #1), to the data receiving device (1200), through a first antenna (antenna #1) within the polarization RXSS phase. And, then, the communication circuit (1140) of the data transmitting device (1100) transmits an EDMG BRP-RX packet and a second receive training field (TRN-R #2), to the data receiving device (1200), through a second antenna (antenna #2) within the same polarization RXSS phase. The transmission of the combination of an EDMG BRP-RX packet and a receive training field may be repeated multiple times within the polarization RXSS phase. Additionally, the communication circuit (1140) of the data transmitting device (1100) may transmit EDMG BRP-RX packets and TRN-Rs along an optimal sector direction that is calculated (or by beamforming) through the SLS phase. This is because, in case the TRN-R is not related to beamforming, antenna gain may not be obtained, which may then result in a situation where the data receiving device fails to receive the TRN-R(s). However, the existing TRN-R, which is not a TRN-R for the polarization alignment, is transmitted in a quasi-omni direction. Meanwhile, since the polarization RXSS is not a receive sector sweep, the responder may perform reception along a quasi-omni direction.

The first receive training field (TRN-R #1) and the second receive training field (TRN-R #2) are orthogonal to one another. For example, when generating the first receive training field (TRN-R #1) and the second receive training field (TRN-R #2), an orthogonal sequence for each receive training field may be used. Therefore, in the polarization RXSS phase, the communication circuit (1210) of the data receiving device (1200) may receive the first receive training field (TRN-R #1) and the second receive training field (TRN-R #2), which are orthogonal to one another, from the communication circuit (1140) of the data transmitting device (1100), and may calculate polarization alignment values of the first antenna (antenna #1) and the second antenna (antenna #2) based on the first receive training field (TRN-R #1) and the second receive training field (TRN-R #2). Thus, the communication circuit (1140) of the data transmitting device (1100) and the communication circuit (1210) of the data receiving device (1200) may complete the polarization alignment for a downlink (or uplink). That is, in the polarization RXSS phase, the communication circuit (1140) of the data transmitting device (1100) and the communication circuit (1210) of the data receiving device (1200) perform receive sector sweep and polarization alignment at the same time.

Meanwhile, in the present embodiment, depending upon whether or not the reciprocity in polarization is ensured, only one of the polarization RXSS of the initiator or the polarization RXSS of the responder may be performed. For example, if the polarization RXSS of the initiator is performed together with the polarization alignment, the polarization RXSS and polarization alignment of the responder may be skipped. In case the number of TRN subfields needed for the polarization alignment is equal to M, a total number of TRN subfields that are needed in the polarization RXSS phase is equal to M.

According to the present embodiment, the data transmitting device and the data receiving device (or initiator and responder) perform polarization alignment for one TX sector. However, after performing MIMO beamforming, the TX sector or TX sector combination that is to be actually used by the data transmitting device and the data receiving device (or initiator and responder) may be different from the TX sector(s) processed with polarization alignment. For example, in case a sector being transmitted in the SLS phase or polarization RXSS phase is a line of sight (LOS) path, and in case a sector being used when performing data transmission after MIMO beamforming is a non-LOS path, the polarization may not be aligned. That is, polarization rotation or distortion may occur. In this case, additional polarization alignment training needs to be performed, and this may act as an overhead in the system.

Performing Polarization Alignment in a MIMO BRP TXSS Phase

As described above, since the TX sector or TX sector combination that is to be used may be different from the TX sector(s) processed with polarization alignment, in order to improve such different, polarization alignment may be performed in a MIMO BRP TXSS phase.

More specifically, the data transmitting device and the data receiving device perform polarization alignment for each TX sector, and the data receiving device may store the polarization alignment value for each TX sector. And, the data transmitting device and the data receiving device may perform TX-RX pair sector combination training based on the polarization alignment value(s) for each TX sector combination when performing beamforming training in the MIMO phase. Herein, in case the data transmitting device is a PCP (or AP) and the data receiving device is a non-PCP (or STA), the PCP and the non-PCP may perform polarization alignment in the MIMO BRP TXSS phase.

Figure 14:
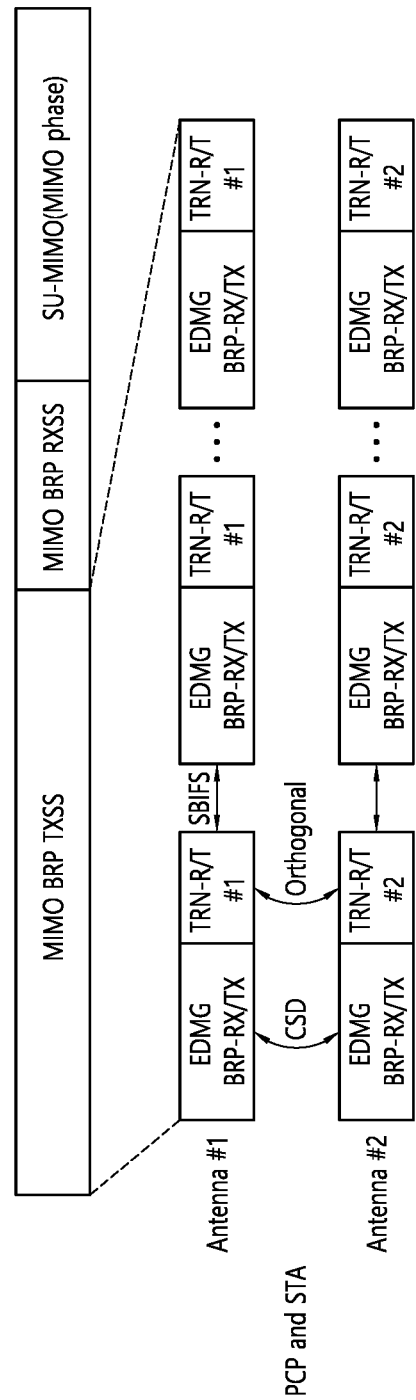
FIG. 14 is a diagram describing a method for performing polarization alignment in a MIMO BRP TXSS phase according to an aspect of the present specification.

FIG. 14 is a diagram describing a method for performing polarization alignment in a MIMO BRP TXSS phase according to an aspect of the present specification.

Referring to FIG. 14, in the MIMO BRP TXSS phase, the communication circuit (1140) of the data transmitting device (1100) may transmit, to the data receiving device (1200), an EDMG BRP-RX/TX packet including receive/transmit training fields (TRN-R/Ts), which are orthogonal to one another, through different antennas.

Although an EDMG BRP TX packet is used in the MIMO BRP TXSS phase only for MIMO beamforming, an EDMG BRP-RX/TX packet is configured to be used in the MIMO BRP TXSS phase for the polarization alignment according to the present embodiment. The usage of the EDMG BRP-RX/TX packet in the MIMO BRP TXSS phase may be instructed (or indicated) in advance by an EDMG BRP request element. More specifically, the usage of the EDMG BRP-RX/TX packet in the MIMO BRP TXSS phase may be instructed (or indicated) by an L-TX-RX field, which is included in the EDMG BRP request element. Herein, a TRN-R/T may be used for both receive sector sweep and polarization alignment. For example, in order to perform receive sector sweep within the TRN-R/T, TRN subfields having the same antenna weight vector (AWV) may be used for polarization alignment and not for receive sector sweep.

The communication circuit (1140) of the data transmitting device (1100) transmits an EDMG BRP-RX/TX packet and a first receive/transmit training field (TRN-R/T #1), to the data receiving device (1200), through a first antenna (antenna #1) within the MIMO BRP TXSS phase. And, then, the communication circuit (1140) of the data transmitting device (1100) transmits an EDMG BRP-RX/TX packet and a second receive/transmit training field (TRN-R/T #2), to the data receiving device (1200), through a second antenna (antenna #2) within the same MIMO BRP TXSS phase. The transmission of the combination of an EDMG BRP-RX/TX packet and a receive/transmit training field may be repeated multiple times within the MIMO BRP TXSS phase.

The first receive/transmit training field (TRN-R/T #1) and the second receive/transmit training field (TRN-R/T #2) are orthogonal to one another. For example, when generating the first receive/transmit training field (TRN-R/T #1) and the second receive/transmit training field (TRN-R/T #2), an orthogonal sequence for each receive/transmit training field may be used.

Therefore, in the MIMO BRP TXSS phase, the communication circuit (1210) of the data receiving device (1200) may receive the first receive/transmit training field (TRN-R/T #1) and the second receive/transmit training field (TRN-R/T #2), which are orthogonal to one another, from the communication circuit (1140) of the data transmitting device (1100), and may calculate polarization alignment values of the first antenna (antenna #1) and the second antenna (antenna #2) based on the first receive/transmit training field (TRN-R/T #1) and the second receive/transmit training field (TRN-R/T #2).

In order to perform receive sector sweep within the TRN-R/T, the communication circuit (1210) of the data receiving device (1200) may use TRN subfields having the same AWV for polarization alignment and not for receive sector sweep. Thus, the communication circuit (1140) of the data transmitting device (1100) and the communication circuit (1210) of the data receiving device (1200) may complete the polarization alignment for a downlink (or uplink). That is, in the MIMO BRP TXSS phase, the communication circuit (1140) of the data transmitting device (1100) and the communication circuit (1210) of the data receiving device (1200) perform transmit sector sweep and polarization alignment at the same time.

Meanwhile, the communication circuit (1210) of the data receiving device (1200) may store the polarization alignment value for each TX sector during the MIMO BRP TXSS phase. And, the communication circuit (1210) of the data receiving device (1200) may perform TX-RX pair sector combination training based on the polarization alignment value(s) for each TX sector combination when performing beamforming training in the MIMO phase.

Meanwhile, in the present embodiment, depending upon whether or not the reciprocity in polarization is ensured, only one of the BRP TXSS of the initiator or the BRP TXSS of the responder may be performed. For example, if the BRP TXSS of the initiator is performed together with the polarization alignment, the BRP TXSS and polarization alignment of the responder may be skipped. In case the number of TRN subfields needed for the transmit sector sweep is equal to N and the number of TRN subfields needed for the polarization alignment is equal to M, a total number of TRN subfields that are needed in the BRP TXSS phase becomes equal to N×M.

Since not all components or steps are essential in the aforementioned wireless data receiving device and method or transmitting device and method, the wireless data receiving device and method or transmitting device and method may be performed by including some or all of the aforementioned components or steps. In addition, embodiments of the aforementioned wireless data receiving device and method or transmitting device and method may be performed in combination with each other. In addition, each of the aforementioned components or steps does not necessarily have to be performed in the order described above, and it is also possible that steps described later are performed prior to steps described earlier.

While the present disclosure has been particularly shown and described with reference to exemplary embodiments thereof, it will be understood by those skilled in the art that various changes in form and details may be made therein without departing from the spirit and scope of the disclosure as defined by the appended claims. Therefore, embodiments of the present disclosure described above can be implemented separately or in combination with each other.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A data transmitting device in a wireless audio/video (AV) system, the data transmitting device comprising:
multiple dual polarization antennas each operating as two different poles;
a communication circuit performing multiple input multiple output (MIMO) beamforming during a data transmission interval (DTI) within a beacon interval (BI), transmitting each of multiple training fields (TRNs)

being generated based on different orthogonal sequences, to a data receiving device, through each corresponding dual polarization antenna, and transmitting a physical layer protocol data unit (PPDU) frame to the data receiving device, based on the MIMO beamforming; and a processor being operatively connected to the communication circuit and being configured to generate AV data that is to be transmitted through the PPDU frame and to provide the generated AV data to the communication circuit, wherein polarization alignment for the multiple dual polarization antennas is performed based on the multiple training fields, wherein the multiple training fields are transmitted by being included in an enhanced directional multi-gigabit (EDMG) beam refinement protocol-reception (BRP-RX) packet as receive training fields (TRN-Rs), and wherein the polarization alignment is performed in a MIMO beam refinement protocol (BRP) receive sector sweep (RXSS) phase.

2. The data transmitting device of claim 1, wherein the multiple training fields are transmitted by being included in a beacon frame as receive training fields (TRN-Rs), and wherein the polarization alignment is performed in a sector level sweep (SLS) phase.

3. The data transmitting device of claim 1, wherein, in case reciprocity in polarization is satisfied, polarization alignment for a link of a direction from the data receiving device to the data transmitting device is skipped.

4. The data transmitting device of claim 1, wherein, in case reciprocity in polarization is not satisfied, polarization alignment for a link of a direction from the data receiving device to the data transmitting device is performed within an Association Beamforming Training (A-BFT), and wherein the multiple training fields are transmitted by being included in a sector sweep (SSW) frame.

5. The data transmitting device of claim 1, wherein the multiple training fields are transmitted by being included in an enhanced directional multi-gigabit (EDMG) beam refinement protocol-reception (BRP-RX) packet as receive training fields (TRN-Rs), and wherein the polarization alignment is performed in a polarization receive sector sweep (RXSS) phase being configured before the MIMO BRP RXSS phase.

6. The data transmitting device of claim 5, wherein the communication circuit transmits the EDMG BRP-RX packet along an optimal sector direction.

7. The data transmitting device of claim 1, wherein the multiple training fields are transmitted by being included in an enhanced directional multi-gigabit (EDMG) beam refinement protocol-reception/transmission (BRP-RX/TX) packet as receive/transmit training fields (TRN-R/Ts), and wherein the polarization alignment is performed in a MIMO BRP transmit sector sweep (TXSS) phase.

8. The data transmitting device of claim 7, wherein the communication circuit performs the polarization alignment and TX sector sweep at the same time based on the EDMG BRP-RX/TX packet.

9. A data receiving device in a wireless audio/video (AV) system, the data receiving device comprising:

multiple dual polarization antennas each operating as two different poles;

a communication circuit performing multiple input multiple output (MIMO) beamforming during a data transmission interval (DTI) within a beacon interval (BI), receiving each of multiple training fields (TRNs) being generated based on different orthogonal sequences, from a data transmitting device, through each corresponding dual polarization antenna, and receiving a physical layer protocol data unit (PPDU) frame from the data transmitting device, based on the MIMO beamforming; and a processor being operatively connected to the communication circuit and being configured to recover AV data being transmitted through the PPDU frame, wherein the communication circuit performs polarization alignment for the multiple dual polarization antennas based on the multiple training fields and calculates polarization alignment values related to each of the multiple dual polarization antennas, wherein the multiple training fields are received by being included in an enhanced directional multi-gigabit (EDMG) beam refinement protocol-reception (BRP-RX) packet as receive training fields (TRN-Rs), and wherein the polarization alignment is performed in a MIMO beam refinement protocol (BRP) receive sector sweep (RXSS) phase.

10. The data receiving device of claim 9, wherein the multiple training fields are received by being included in a beacon frame as receive training fields (TRN-Rs), and wherein the polarization alignment is performed in a sector level sweep (SLS) phase.

11. The data receiving device of claim 9, wherein, in case reciprocity in polarization is satisfied, polarization alignment for a link of a direction from the data receiving device to the data transmitting device is skipped.

12. The data receiving device of claim 9, wherein, in case reciprocity in polarization is not satisfied, polarization alignment for a link of a direction from the data receiving device to the data transmitting device is performed within an Association Beamforming Training (A-BFT), and wherein the multiple training fields are received by being included in a sector sweep (SSW) frame.

13. The data receiving device of claim 9, wherein the multiple training fields are received by being included in an enhanced directional multi-gigabit (EDMG) beam refinement protocol-reception (BRP-RX) packet as receive training fields (TRN-Rs), and wherein the polarization alignment is performed in a polarization receive sector sweep (RXSS) phase being configured before the MIMO BRP RXSS phase.

14. The data receiving device of claim 13, wherein the communication circuit receives the EDMG BRP-RX packet along an optimal sector direction.

15. The data receiving device of claim 9, wherein the multiple training fields are received by being included in an enhanced directional multi-gigabit (EDMG) beam refinement protocol-reception/transmission (BRP-RX/TX) packet as receive/transmit training fields (TRN-R/Ts), wherein the polarization alignment is performed in a MIMO BRP transmit sector sweep (TXSS) phase, and wherein the communication circuit calculates polarization alignment values for each transmit sector.

16. The data receiving device of claim 15, wherein the communication circuit performs the polarization alignment and TX sector sweep at the same time based on the EDMG BRP-RX/TX packet.

* * * * *